(12) United States Patent
Sadasivan et al.

(10) Patent No.: US 12,168,575 B2
(45) Date of Patent: *Dec. 17, 2024

(54) IN-BUILT DIVERT ELEMENTS FOR MOTORIZED CONVEYOR ROLLERS

(71) Applicant: Intelligrated Headquarters, LLC, Mason, OH (US)

(72) Inventors: Saravanan Sadasivan, Bangalore (IN); Abhishek Kolay, Howrah (IN)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,407

(22) Filed: Oct. 31, 2023

(65) Prior Publication Data

US 2024/0059496 A1 Feb. 22, 2024

Related U.S. Application Data

(63) Continuation of application No. 17/811,915, filed on Jul. 12, 2022, now Pat. No. 11,845,613.

(51) Int. Cl.
*B65G 39/18* (2006.01)
*B65G 13/10* (2006.01)

(52) U.S. Cl.
CPC ............. *B65G 39/18* (2013.01); *B65G 13/10* (2013.01)

(58) Field of Classification Search
CPC ................................ B65G 39/18; B65G 13/10
USPC .............................. 198/782, 786; 193/35 MD
See application file for complete search history.

(56) References Cited

U.S. PATENT DOCUMENTS

| 3,370,685 A | 2/1968 | Guilie |
| 3,552,541 A | 1/1971 | Riggs |
| 3,964,588 A | 6/1976 | Kornylak |
| 3,976,177 A | 8/1976 | Brown |
| 4,018,322 A | 4/1977 | Brown et al. |
| 4,372,435 A | 2/1983 | Bradbury |
| 5,064,045 A | 11/1991 | Leon |
| 5,333,722 A | 8/1994 | Ouellette |
| 5,367,352 A | 11/1994 | Schulz-Lekies |
| 5,934,441 A | 8/1999 | Uchida et al. |

(Continued)

FOREIGN PATENT DOCUMENTS

| CN | 210510636 U | 5/2020 |
| DE | 2854552 C2 | 2/1982 |

(Continued)

OTHER PUBLICATIONS

"Modsort® Divert & Transfer Module," Regal Rexnord, 1-8, (2002). [Retrieved from the Internet Jan. 10, 2023: <URL: https://www.regalrexnord.com/brands/System-Plast/Products/ModSort>].

Extended European Search Report Mailed on Jan. 15, 2024 for EP Application No. 23177591, 6 page(s).

(Continued)

*Primary Examiner* — Mark A Deuble
(74) *Attorney, Agent, or Firm* — Alston & Bird LLP

(57) ABSTRACT

Apparatuses, methods and systems comprising element in-built diverts for motorized conveyor rollers are provided. An example conveyor roller can include a housing that forms a cylindrical tube. The conveyor roller includes a plurality of element in-built diverts disposed on an exterior surface of the housing. The plurality of element in-built diverts are reconfigurable between one or more orientations with respect to the housing to divert an item an angle with respect to the housing.

20 Claims, 14 Drawing Sheets

(56) References Cited

U.S. PATENT DOCUMENTS

| | | | |
|---|---|---|---|
| 6,116,405 | A | 9/2000 | Gauchon |
| 7,431,148 | B2 | 10/2008 | Li et al. |
| 7,980,335 | B2 | 7/2011 | Potter |
| 8,387,752 | B2 | 3/2013 | Lagerstedt |
| 9,988,218 | B2 | 6/2018 | Dugat et al. |
| 10,479,136 | B2 | 11/2019 | McKinnon |
| 11,247,849 | B2 | 2/2022 | Kuhn et al. |
| 11,654,714 | B2 | 5/2023 | Wang et al. |
| 11,845,613 | B1 * | 12/2023 | Sadasivan .............. B65G 39/18 |
| 11,993,462 | B2 | 5/2024 | Kolay et al. |
| 2024/0017927 | A1 | 1/2024 | Kolay et al. |

FOREIGN PATENT DOCUMENTS

| | | |
|---|---|---|
| DE | 4322114 A1 | 1/1994 |
| KR | 10-2010-0007499 U | 7/2010 |
| WO | 01/55012 A1 | 8/2001 |

OTHER PUBLICATIONS

Non-Final Rejection Mailed on Dec. 21, 2023 for U.S. Appl. No. 17/812,544, 9 page(s).
Non-Final Rejection Mailed on Jun. 15, 2023 for U.S. Appl. No. 17/811,915, 13 page(s).
Notice of Allowance and Fees Due (PTOL-85) Mailed on Jul. 31, 2023 for U.S. Appl. No. 17/811,915, 7 page(s).
U.S. Appl. No. 17/811,915, filed Jul. 12, 2022, U.S. Pat. No. 11,845,613, Patented.
Notice of Allowance and Fees Due (PTOL-85) Mailed on Jun. 12, 2024 for U.S. Appl. No. 17/812,544, 8 page(s).

* cited by examiner

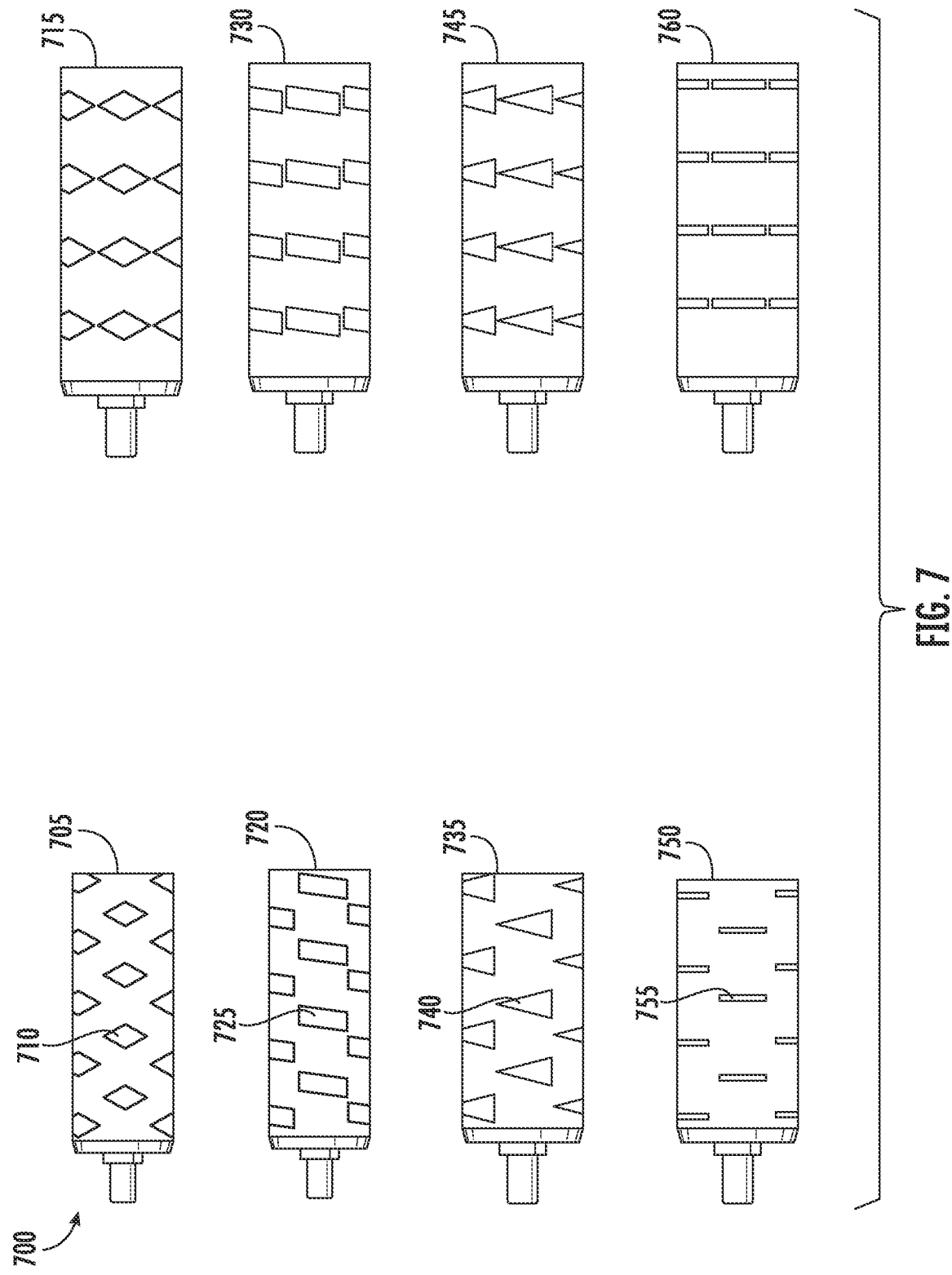

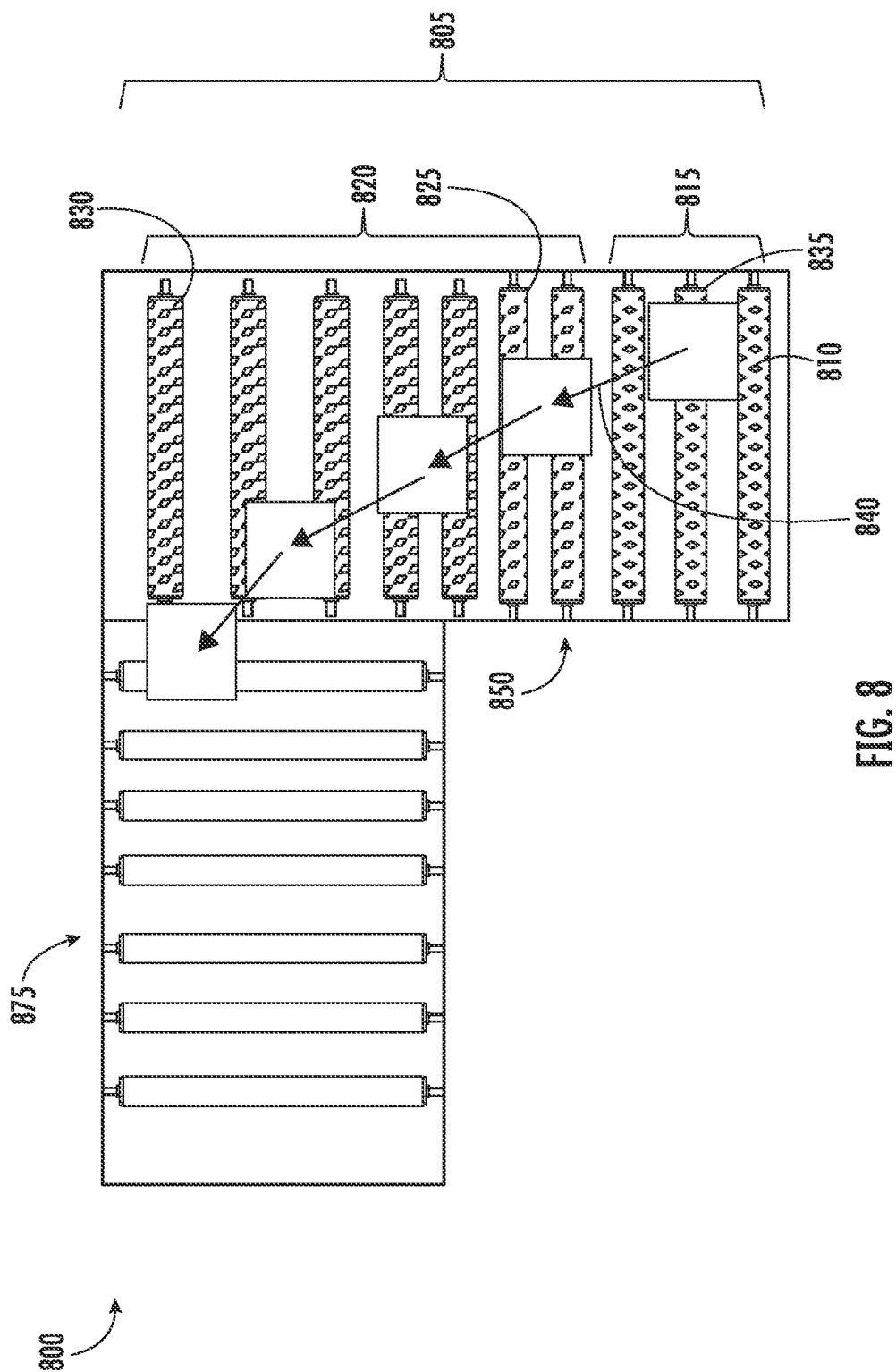

IN-BUILT DIVERT ELEMENTS FOR MOTORIZED CONVEYOR ROLLERS

CROSS REFERENCE TO RELATED APPLICATIONS

This application is a continuation of U.S. application Ser. No. 17/811,915, entitled "IN-BUILT DIVERT ELEMENTS FOR MOTORIZED CONVEYOR ROLLERS," filed Jul. 12, 2022, the contents of which are incorporated herein by reference in their entireties.

BACKGROUND

The present disclosure relates in general to a conveyor rollers with element in-built diverts for a conveyor system. Many rotating apparatuses and devices for conveyor systems are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems comprising reconfigurable motorized conveyor rollers.

In accordance with various examples of the present disclosure, a conveyor roller is provided. The conveyor roller comprises a housing forming a cylindrical tube; and a plurality of element in-built diverts disposed on an exterior surface of the housing. The plurality of element in-built diverts are configurable between one or more orientations with respect to the housing.

In some embodiments, the plurality of element in-built diverts protrude from the exterior surface of the housing to form a plurality of partial ridges around the exterior surface of the housing.

In some embodiments, the conveyor roller is configured to rotate the housing about a center axis.

In a diverting orientation, the plurality of element in-built diverts form a diverting plurality of partial ridges that are operable to divert a motion of an item disposed on the conveyor roller. The diverting orientation corresponds to a diverting angle with respect to a center axis of the conveyor roller.

In a non-diverting orientation, the plurality of element in-built diverts form a non-diverting plurality of partial ridges that are operable to maintain a forward motion of an item disposed on the conveyor roller. The non-diverting orientation corresponds to a non-diverting angle perpendicular to the center axis of the conveyor roller.

In some embodiments, the conveyor roller comprises a magnetic switchable device operable to change a magnetic field of the housing. A current orientation of the plurality of element in-built diverts is based on the magnetic field. In some embodiments, at least a portion of an element in-built divert comprises a metal material with one or more magnetic properties.

In some embodiments, the conveyor roller comprises an electromagnetic actuation system operable to change a current orientation of the plurality of element in-built diverts.

In some embodiments, the conveyor roller comprises a plurality of mechanical links disposed within the housing and coupled to a center shaft of the conveyor roller. The plurality of mechanical links comprise a respective mechanical link coupled to a respective element in-built divert. The housing comprises a plurality of apertures. The respective mechanical link is physically coupled to the respective element in-built divert through a respective aperture of the housing. A respective mechanical link is adjustable to change a current orientation of the respective element in-built divert.

In some embodiments, the conveyor roller comprises a motor assembly and a drive assembly at least partially disposed within the housing that are configured to cause a rotation of at least a portion of the conveyor roller. The mechanical link is operatively coupled to the motor assembly. The motor assembly is configured to adjust the respective mechanical link to change the current orientation of the respective element in-built divert.

In some embodiments, the conveyor roller comprises a controller component in electronic communication with the motor assembly and the drive assembly. The controller component is configured to cause an adjustment of the respective mechanical link responsive to an input indicative of a diversion angle for the plurality of element in-built diverts.

In some embodiments, the plurality of element in-built diverts are arranged in a staggered pattern on the exterior surface of the housing.

In some embodiments, the plurality of element in-built diverts are arranged in a linear pattern on the exterior surface of the housing.

In accordance with various examples of the present disclosure, a method is provided. The method comprises receiving, by a controller component of a conveyor roller, configuration data from a computing entity in electronic communication with the controller component, the configuration data indicative of diversion angle for the conveyor roller; and causing, by the controller component and based at least in part on the configuration data, a movement of a plurality of element in-built diverts disposed on an exterior surface of a housing of the conveyor roller.

In some embodiments, the diversion angle indicates an angle to divert an item from a conveyor line associated with the conveyor roller.

In some embodiments, causing the movement of the plurality of element in-built diverts disposed on the exterior surface of the housing of the conveyor roller comprises providing one or more control instructions to an actuation device operatively coupled to the plurality of element in-built diverts.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale, unless described otherwise. For example, the dimensions of some of the elements can be exaggerated relative to other elements, unless described otherwise. Embodiments incorporating teachings of the present disclosure are shown and described with respect to the figures presented herein, in which:

FIG. 7 illustrates example divert element configurations in accordance with various embodiments of the present disclosure;

FIG. 8 illustrates an example conveyor roller line in accordance with various embodiments of the present disclosure;

DETAILED DESCRIPTION OF THE INVENTION

Figure 1:
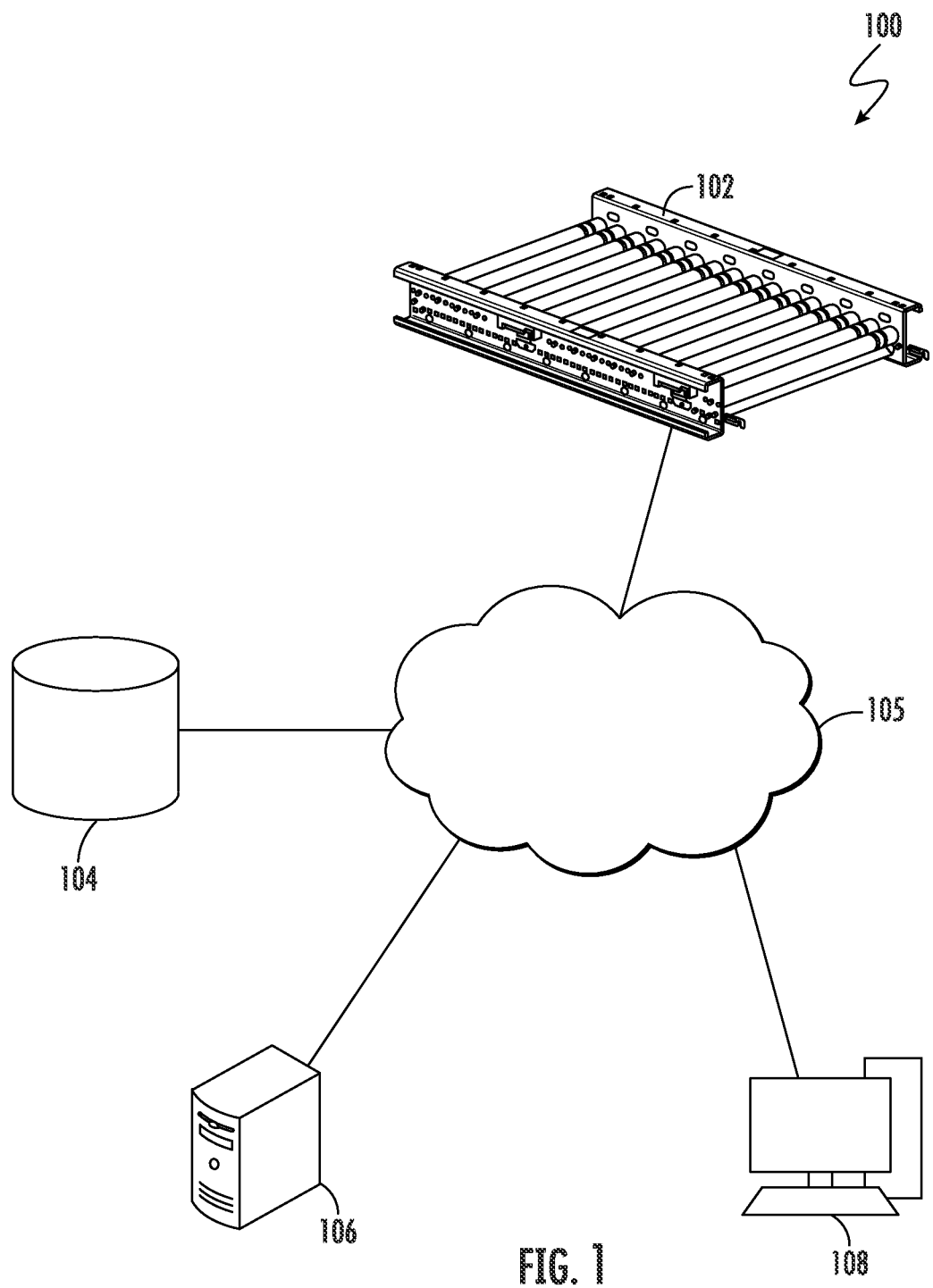
FIG. 1 illustrates an example of a system in accordance with various embodiments of the present disclosure.

Some embodiments of the present disclosure will now be described more fully hereinafter with reference to the accompanying drawings, in which some, but not all embodiments of the disclosure are shown. Indeed, these disclosures can be embodied in many different forms and should not be construed as limited to the embodiments set forth herein; rather, these embodiments are provided so that this disclosure will satisfy applicable legal requirements Like numbers refer to like elements throughout.

The components illustrated in the figures represent components that can or can not be present in various embodiments of the present disclosure described herein such that embodiments can include fewer or more components than those shown in the figures while not departing from the scope of the present disclosure. Some components can be omitted from one or more figures or shown in dashed line for visibility of the underlying components.

The phrases "in an example embodiment," "some embodiments," "various embodiments," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other embodiments.

If the specification states a component or feature "can," "can," "could," "should," "would," "preferably," "possibly," "typically," "optionally," "for example," "often," or "might" (or other such language) be included or have a characteristic, that a specific component or feature is not required to be included or to have the characteristic. Such components or features can be optionally included in some embodiments, or can be excluded.

The term "electronically coupled" or "in electronic communication with" in the present disclosure can refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) can be transmitted to and/or received from the electrical elements and/or electric circuit(s) that are electronically coupled.

The terms "conveyor," "conveyor section," "conveyor bed," "conveyor assembly" or "conveyor system," and similar terms are used interchangeably herein to refer to an apparatus that is configured to convey objects or articles within a material handling system in accordance with embodiments of the present disclosure. A motorized conveyor roller according to some embodiments discussed herein can comprise a plurality of drive components including a motor assembly and a drive assembly which operate to drive a housing (e.g., roller tube). These assemblies can have one or more components that are arranged in various configurations within an inner portion of the motorized conveyor roller. In some embodiments, the drive assembly can be fixed relative to the housing (e.g., roller tube), while the motor assembly is fixed relative to a frame supporting the roller tube, such that the motor assembly can be configured to rotate the drive assembly and roller tube.

In some embodiments, conveyor rollers can be utilized in conveyor lines to propel items along a path to multiple destinations. An item is diverted at a particular point along the path to help route the item to a particular destination. The item is diverted, for example, from the conveyor line (e.g., to another conveyor line, a sidetrack, a sorting area, etc.), to another section of the conveyor line (e.g., through a 90 degree turn of the conveyor), and/or to another position on the conveyor line (e.g., a position along the length of the conveyor rollers).

Conveyor lines can be configured with distinct divert sections made up of a plurality of divert mechanisms to enable the diversion of items at particular points along the conveyor line. Such divert sections can include separate sections of the conveyor line that are integrated between non-diverting conveyor rollers. Each divert section can include a different set of diverting mechanisms for diverting items at specific angles. These mechanisms are stored, maintained, and configured in addition to (and separately from) non-diverting conveyor rollers used elsewhere in the conveyor line. As a result, inventory and storage costs to the conveyor line are increased. Moreover, the divert mechanisms can have size and shape constraints limiting their flexibility for setup anywhere in the conveyor line. At times, these divert mechanisms can lack various functionalities such as performing packet position control, transferring polybags, and correctly predicting angles for diverting items on the conveyor line.

In accordance with various embodiments of the present disclosure, example methods, apparatuses, computer program products and systems are provided that, in some examples provide element in-built diverts for conveyor rollers. The element in-built diverts are controllably actuated to divert items on command at any point on the conveyor line and can be integrated with traditionally non-diverting conveyor rollers.

For example, the present disclosure provides a conveyor roller with a housing forming a cylindrical tube. The conveyor roller includes a plurality of element in-built diverts disposed on an exterior surface of the housing. The plurality of element in-built diverts are configurable between one or more orientations with respect to the housing. At each orientation, the element in-built diverts can cause the conveyor roller to move an item in a particular direction (e.g., forward, rightward, leftward, etc.) with respect to the housing. As such, the present disclosure provides a conveyor roller that includes in-built divert mechanisms for controllably diverting items along a conveyor line. The flexible design can be utilized, in some examples, to dynamically divert items from any point along a conveyor line using a set of compatible conveyor rollers. In this manner, the element in-built diverts described herein enable a conveyor line configuration that can divert packages at desired angles on the conveyor line without additional divert mechanisms. In addition, the element in-built diverts enable the right-angle transfer of items (e.g., around a corner of the conveyor line) without modification to the conveyor line. In some embodiments, the element in-built diverts can further enable the repositioning of items along the length of conveyor rollers that make up the conveyor line, for example, to create a singulated flow of items that can be easily processed. In this manner, the element in-built diverts described herein provide the practical improvements of increased flexibility, lowered cost, and diminished conveyor line setup restrictions for conventional conveyor rollers.

Referring now to FIG. 1, a schematic diagram depicting an example system 100 in accordance various embodiments of the present disclosure is provided. As depicted, the example system 100 includes a conveyor 102 comprising one or more motorized conveyor rollers, one or more computing entities 106 (e.g., servers), one or more databases 104, one or more networks 105, one or more user computing entities 108, and/or the like. In various examples, the system 100 can operate to convey objects within a particular location or environment.

In various embodiments, the conveyor 102 can be configured to transport objects within a particular location or environment utilizing one or more motorized conveyor rollers. In some embodiments, the conveyor 102 includes one or more motorized conveyor rollers, the one or more computing entities 106, the one or more databases 104 and/or the one or more user computing entities 108 are in electronic communication with each other over the one or more networks 105 such that they can exchange data (e.g., receive and transmit data) with one another (e.g., periodically and/or in response to requests). Each of the components of the system 100 can be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, stand-alone devices, the various embodiments are not limited to this particular architecture.

As depicted in FIG. 1, the example system 100 includes one or more computing entities 106. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 106 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 106 with the assistance of the processing element and the operating system.

As indicated, in one embodiment, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components can be located remotely from other computing entity 106 components, such as in a distributed system. Furthermore, one or more of the components can be aggregated and additional components performing functions described herein can be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 includes a user computing entity 108. In various embodiments, the user computing entity 108 can be or include one or more mobile devices, wearable computing devices, and/or the like. An example user computing entity 108 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 108 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 108 can be capable of operating with one or more air interface standards, communication protocols, modulation types, and access types. More particularly, the user computing entity 108 can operate in accordance with any of a number of wireless communication standards and protocols. In a particular embodiment, the user computing entity 108 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 108 can communicate with various other devices using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 can include location determining aspects, devices, modules, functionalities, and/or similar words used herein interchangeably to acquire location information/data regularly, continuously, or in response to certain triggers.

The user computing entity 108 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can include or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 can be configured to communicate with one another via one or more networks 105. The networks 105 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 can have any suitable communication range associated therewith and can include, for example, global networks (e.g., the Internet), MANs, WANs, LANs, or PANs. In addition, the networks 105 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 can include one or more additional and/or alternative elements, and/or can be different from that illustrated in FIG. 1.

Figure 2A:
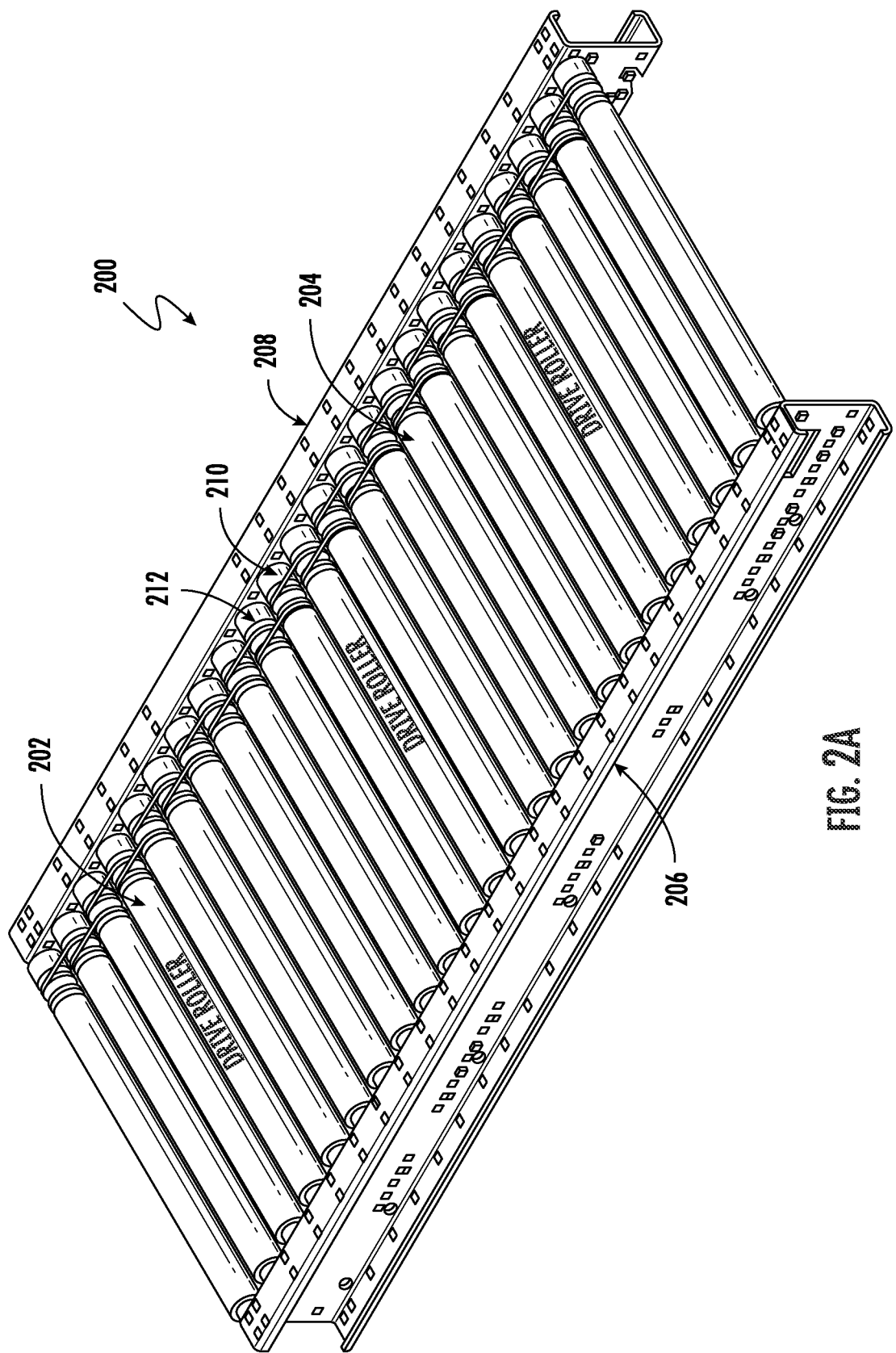
FIGS. 2A-B illustrate schematic diagrams of example distinct sections of conveyor lines with motorized and non-motorized rollers, in accordance with various embodiments of the present disclosure.
Figure 2B:
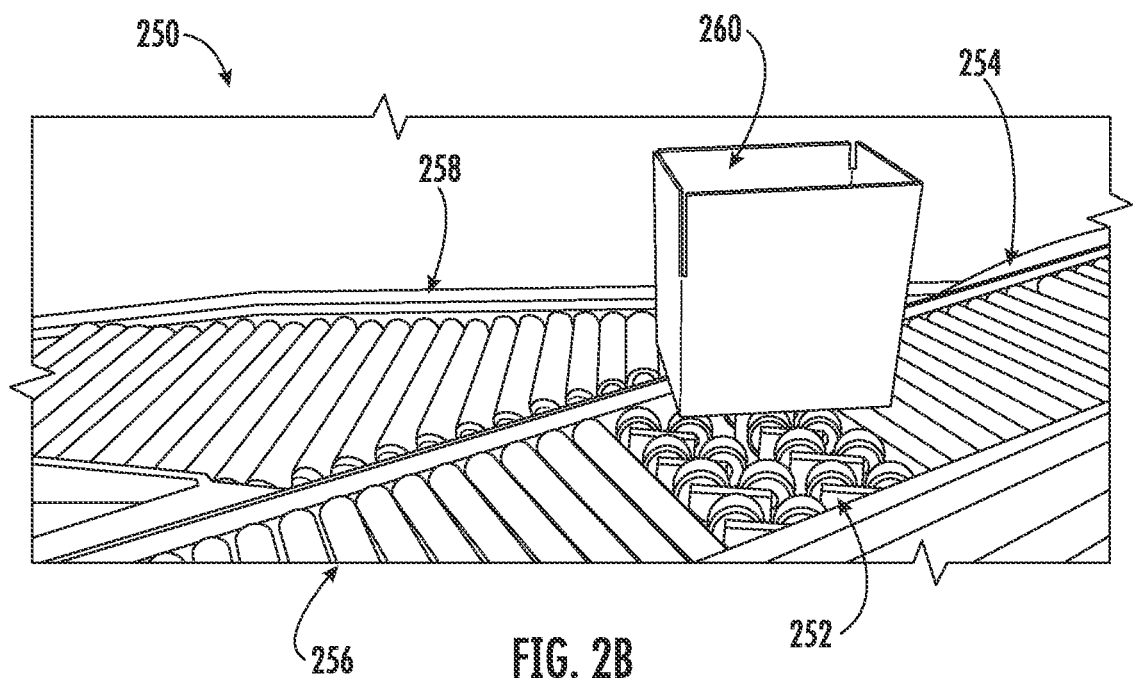

FIGS. 2A-B illustrate schematic diagrams of example distinct sections of conveyor lines with motorized and non-motorized rollers, in accordance with various embodiments of the present disclosure. FIG. 2A illustrates an example non-divert section 225 of a conveyor line 200 with motorized and non-motorized conveyor rollers in accordance with various embodiments of the present disclosure. FIG. 2B illustrates an example divert section 250 of the conveyor line 200 with motorized and non-motorized conveyor rollers in accordance with various embodiments of the present disclosure.

As depicted in FIG. 2A, the example conveyor line 200 can include one or more motorized conveyor rollers, e.g., motorized conveyor roller 202, and one or more non-motorized conveyor rollers, e.g., non-motorized conveyor roller 204. In some embodiments, the conveyor line 200 can include at least a first rail 206 and a second rail 208. As depicted in FIG. 2A, the plurality of motorized conveyor rollers and non-motorized conveyor rollers (e.g., motorized conveyor roller 202 and non-motorized conveyor roller 204) are mechanically/operatively coupled to the first rail 206 and the second rail 208. In some embodiments, the first rail 206 and the second rail 208 can include one or more sets of apertures configured to receive the plurality of motorized conveyor rollers and non-motorized conveyor rollers (e.g., motorized conveyor roller 202 and non-motorized conveyor roller 204).

In some embodiments, as depicted in FIG. 2A, the non-motorized conveyor rollers (e.g., non-motorized conveyor roller 204) can be or include idler rollers or driven rollers. Additionally, the motorized conveyor rollers (e.g., motorized conveyor roller 202) can be or comprise drive rollers. In various embodiments, the motorized conveyor rollers/drive rollers are configured to drive the non-motorized conveyor rollers/idler rollers. For example, the motorized conveyor rollers/drive rollers can include drive bands, e.g., drive band 210. The example drive bands can comprise 0-drive bands to drive the non-motorized conveyor rollers/idler rollers. As depicted in FIG. 2, in some examples, the motorized conveyor rollers/drive rollers and the non-motorized conveyor roller/idler rollers are connected to each other through a series of drive bands, e.g, drive band 210, in order to drive the non-motorized conveyor rollers/idler rollers. As further depicted, each of the drive bands, e.g., drive band 210, is reeved around a tracking ring, e.g., tracking ring 212, provided on the motorized conveyor rollers/drive rollers and the non-motorized conveyor rollers/idler rollers. The example tracking ring 212 can operate to ensure that the drive band 210 does not slip out of the drive rollers and the idler rollers when operating at full speed. The example drive band 210 can be connected to idler pulleys provided on/attached to either the first rail 206 or the second rail 208 of the conveyor line 200 to maintain a target tension between the example drive band 210 and the motorized conveyor rollers/drive rollers and the non-motorized conveyor rollers/idler rollers (e.g., motorized conveyor roller 202 and non-motorized conveyor roller 204).

FIG. 2A is one example section of the conveyor line 200. Conventional conveyor lines can include a plurality of different sections, each including a plurality of motorized and/or non-motorized conveyor rollers. The example non-divert section 225 can be configured as a section of the conveyor line 200 in the which the first rail 206 and the second rail 208 include continuous, straight rails. The conveyor line 200 can include a plurality of different portions with one or more configurations.

FIG. 2B, for example, illustrates an example divert section 250 of the conveyor line 200. The example divert section 250 of the conveyor line 200 can include a diverting section 252 between three non-diverting sections 254, 256, and 258. The non-diverting sections 254, 256, and 258 can include one or more motorized and/or non-motorized conveyor rollers including similar dimensions, whereas the diverting section 252 can include a distinct set of divert rollers different from the motorized and non-motorized conveyor rollers. Unlike the conveyor rollers of the non-diverting sections 254, 256, and 258, the distinct set of divert rollers can be moved at one or more desired angles to divert an item 260 from a first section to another section of the conveyor line 200.

Accordingly, a plurality of different sets of rollers with multiple configurations can be used for the different sections in a divert section 250 of the conveyor line 200 to facilitate the desired movement of the item 260. This results in increased inventory and storage costs and limits the flexibility of conventional conveyor systems. Moreover, distinct diverting sections such as the diverting section 252 may lead to additional setup time and expertise. A conveyor roller integrated divert mechanism that can be integrated with the motorized and/or non-motorized conveyor rollers of the non-diverting sections 254, 256, and 258 of the conveyor line 200 is therefore advantageous.

Figure 3:
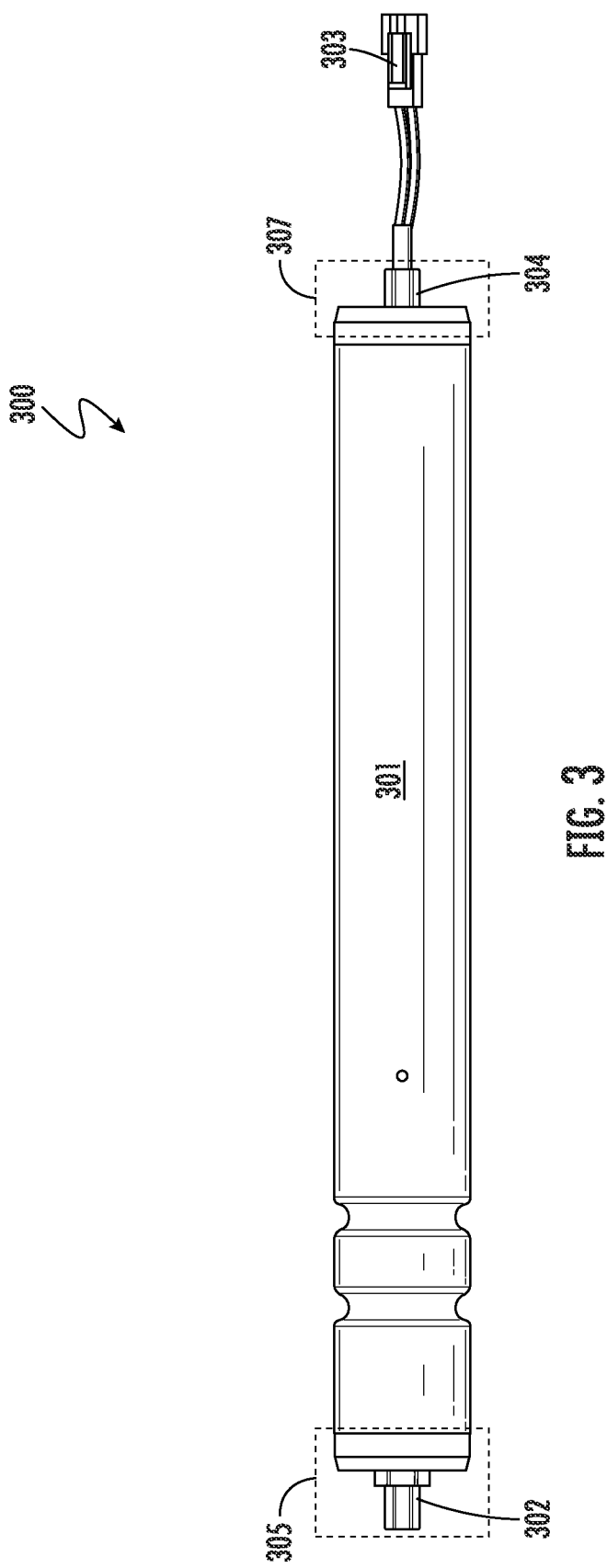
FIG. 3 illustrates an example integrated motorized conveyor roller in accordance with various embodiments of the present disclosure.

FIG. 3 is a schematic diagram depicting a perspective view of an example integrated motorized conveyor roller 300 in accordance with various embodiments of the present disclosure. In various embodiments, the example integrated motorized conveyor roller 300 can be part of a conveyor/conveyor system (e.g., the conveyor line 200 described above in connection with FIGS. 2A-B) and can be configured to drive one or more non-motorized conveyor rollers that are operatively coupled thereto. The conveyor/conveyor system can be part of an automated or semi-automated warehousing system in which objects can be stored, retrieved, conveyed, and/or the like in response to system instructions and/or user interactions via a computing entity (such as the user computing entity 108 described above in connection with FIG. 1). For example, the example integrated motorized conveyor roller 300 can be configured to convey objects along at least a portion of a conveyor line based at least in part on system instructions.

As depicted in FIG. 3, the example integrated motorized conveyor roller 300 comprises a housing 301 (e.g., roller tube) configured to contain one or more components/elements of the integrated motorized conveyor roller 300 (e.g., a controller component, as discussed in further detail below). In some examples, the housing 301 (e.g., roller tube) of the integrated motorized conveyor roller 300 comprises a hollow cylindrical body and can comprise metal, plastic, combinations thereof, and/or the like. As discussed herein, the cylindrical body can include an expandable body.

As further illustrated in FIG. 3, the example integrated motorized conveyor roller 300 comprises a first end cap 305 defining a first end/surface of the example integrated motorized conveyor roller 300. As depicted, the first end cap 305 comprises a first appendage 302 configured to be operatively coupled to a conveyor (e.g., disposed between a first rail and a second rail, such as within an aperture of the first rail).

Additionally, as depicted, the example integrated motorized conveyor roller 300 comprises a second end cap 307 defining a second end/surface of the example integrated motorized conveyor roller 300. As depicted, the second end cap 307 comprises a second appendage 304 configured to be operatively coupled to a conveyor (e.g., disposed between a first rail and a second rail, such as within an aperture of the second rail). As further depicted in FIG. 3, the integrated motorized conveyor roller 300 comprises a power cable 303 disposed adjacent the second end cap 307 that is configured to be connected to a power supply. Additionally, and/or alternatively, the power cable 303 can also be configured to provide a connection for data transfer.

Figure 4:
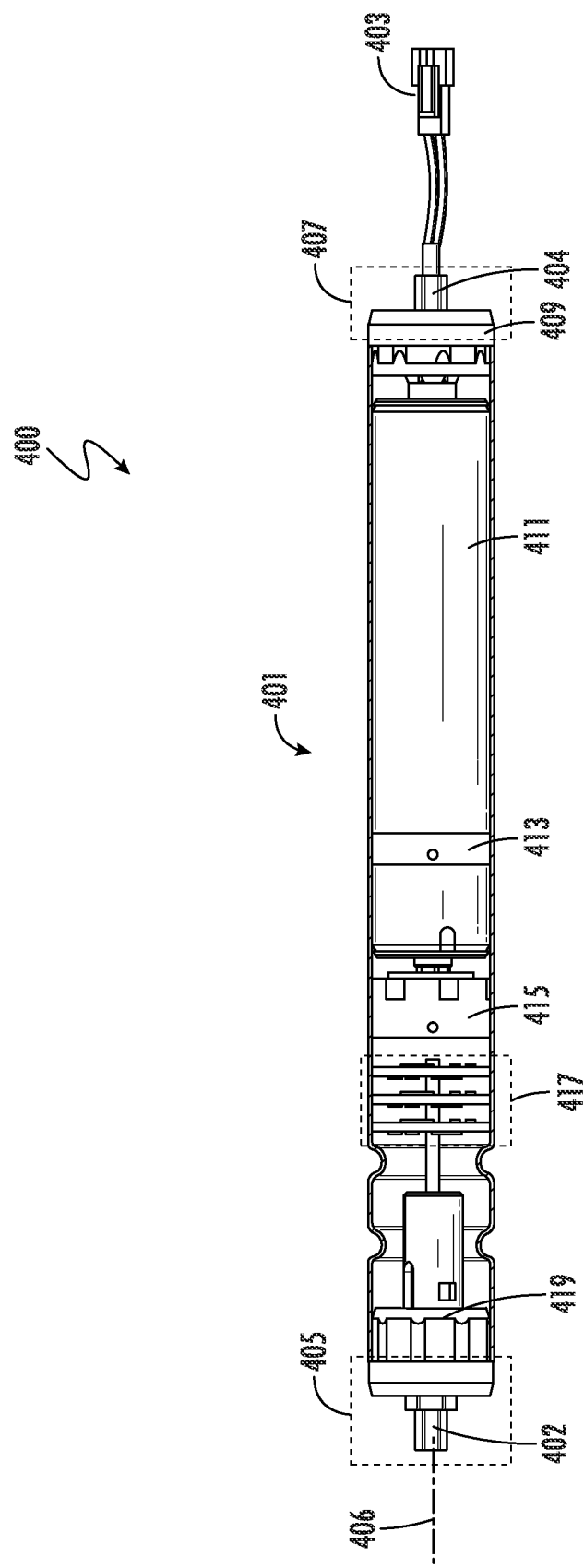
FIG. 4 illustrates a side section view of an example integrated motorized conveyor roller in accordance with various embodiments of the present disclosure.

Referring now to FIG. 4, a schematic diagram depicting a side section view of an example integrated motorized conveyor roller 400 in accordance with various embodiments of the present disclosure is provided. The example integrated motorized conveyor roller 400 can be similar or identical to the integrated motorized conveyor roller 300 discussed above in connection with FIG. 3. The example integrated motorized conveyor roller 400 can be part of a conveyor/conveyor system and can be configured to drive one or more non-motorized conveyor rollers that are operatively coupled thereto. The example integrated motorized conveyor roller 400 can be configured to convey objects along at least a portion of a conveyor line based at least in part on system instructions and/or user interactions via a computing entity (such as the user computing entity 108 described above in connection with FIG. 1). As illustrated in FIG. 4, the example integrated motorized conveyor roller 400 comprises a power cable 403, a first end cap 405, a second end cap 407, a motor assembly 411, a load sensor 413, a drive assembly 415, a controller component 417 and a bearing assembly 419. In various embodiments, the elements/components of the integrated motorized conveyor roller 400 (e.g., the motor assembly 411, the load sensor 413 and the drive assembly 415) are in electronic communication with the controller component 417 such that they can exchange data/information with one another.

As noted above, and as depicted in FIG. 4, the example integrated motorized conveyor roller 400 comprises a housing 401 (e.g., roller tube) configured to contain one or more components/elements of the integrated motorized conveyor roller 300. In particular, as depicted, the example integrated motorized conveyor roller 400 is configured to contain at least the motor assembly 411, the load sensor 413, the drive assembly 415, the controller component 417 and the bearing assembly 419. In various examples, the housing 401 (e.g., roller tube) of the integrated motorized conveyor roller 400 comprises a hollow cylindrical body and can comprise metal, plastic, combinations thereof, and/or the like.

As further illustrated in FIG. 4, the example integrated motorized conveyor roller 400 comprises a first end cap 405 defining a first end/surface of the example integrated motorized conveyor roller 400. As depicted, the first end cap 405 comprises a first appendage 402 configured to be operatively coupled to a conveyor (e.g., disposed between a first rail and a second rail, such as within an aperture of the first rail).

As noted above, and as depicted in FIG. 4, the example integrated motorized conveyor roller 400 can include one or more of a motor assembly 411, a drive assembly 415 and a bearing assembly 419 that operate to drive/rotate the housing 401 (e.g., roller tube) of the integrated motorized conveyor roller 400 with respect to a central axis 406 of the integrated motorized conveyor roller 400. In some embodiments, each of the motor assembly 411 and the drive assembly 415 are at least partially disposed within the housing 401 (e.g., roller tube) of the integrated motorized conveyor roller 400. For example, as shown, at least a surface of the motor assembly 411 and at least a surface of the drive assembly 415 can be in contact with an inner surface of the housing 401 (e.g., roller tube) of the integrated motorized conveyor roller 400. In some embodiments, the housing 401 can include multiple sections. The at least one surface of the motor assembly 411 and the drive assembly 415 can be in contact at least one section (e.g., an inner section), while an outer section may be reconfigured without disrupting the functions of the motor assembly 411 and the drive assembly 415.

The drive assembly 415 can be configured to transfer torque from the motor assembly 411 to the housing 401 (e.g., roller tube) of the integrated motorized conveyor roller. Additionally, as illustrated, the example integrated motorized conveyor roller 400 comprises a bearing assembly 419 configured to, in conjunction with the motor assembly 411 and drive assembly 415, facilitate rotation of the integrated motorized conveyor roller 400 about the central axis 406. As shown, the bearing assembly 419 is disposed adjacent and operatively coupled to the first end cap 405 of the integrated motorized conveyor roller 400. In some embodiments, the drive assembly 415 can be fixed relative to the housing 401 (e.g., roller tube), while the motor assembly 411 is fixed relative to a frame supporting the roller tube, such that the motor assembly 411 can rotate the drive assembly 415 and the roller tube.

As further depicted, the example integrated motorized conveyor roller 400 comprises a second end cap 407 defining a second end/surface of the example integrated motorized conveyor roller 300. As depicted, the second end cap 407 comprises a second appendage 404 configured to be operatively coupled to a conveyor (e.g., disposed between a first rail and a second rail, such as within an aperture of the second rail). As noted above, the integrated motorized conveyor roller 400 comprises a power cable 403 disposed adjacent the second end cap 407 that is configured to be connected to a power supply. In some embodiments, the second end cap 407 comprises a light emitting diode (LED) element 409 that is configured to provide a visual alert in response to a detected condition of the integrated motorized conveyor roller 400.

In some embodiments, as further depicted in FIG. 4, the example integrated motorized conveyor roller 400 comprises a load sensor 413. As shown, the load sensor 413 is disposed within the housing 401 (e.g., roller tube) of the integrated motorized conveyor roller 400 between the motor assembly 411 and the drive assembly 415. The load sensor 413 is configured to determine a weight of an object disposed on at least a portion of the integrated motorized conveyor roller 400, such as by converting a weight of an object into a measurable electrical signal. For example, as an object moves along a conveyor and is incident on the motor assembly 411, the load sensor 413 can generate a measurable electrical signal (e.g., voltage output) corresponding with a weight of the object. In various embodiments, the load sensor 413 can be or comprise one or more strain gauges, piezoelectric sensors and/or the like.

As noted above, and as depicted in FIG. 4, the integrated motorized conveyor roller 400 comprises a controller component 417. As depicted, the controller component 417 can be at least partially disposed within the housing 401 (e.g., roller tube) of the integrated motorized conveyor roller 400. As depicted, the controller component 417 is disposed between the bearing assembly 419 and the drive assembly 415. In various embodiments, the controller component 417 can be or comprise one or more printed circuit boards (PCBs). For example, as depicted, the controller component 417 comprises a PCB stack comprising three PCBs configured to be in electronic communication with one another. In various embodiments, the controller component 417 comprises a controller module that is configured to control operations of the motor assembly 411, drive assembly 415, load sensor 413 and/or the like. In some embodiments, the controller component 417 comprises a wireless module that is configured to provide a communication interface (e.g., Bluetooth, Bluetooth Low Energy (BLE), low-power wide-area network such as Long Range (LoRa), and/or the like) between the integrated motorized conveyor roller 400 and one or more other motorized conveyor rollers. Additionally, in some embodiments, the controller component 417 comprises a power module that is configured to control operations of electronic elements (e.g., circuitry, sensing element and/or the like) of the integrated motorized conveyor roller 400.

While FIG. 4 depicts an example integrated motorized conveyor roller 400, it is noted that the scope of the present disclosure is not limited to the examples shown in FIG. 4. An example integrated motorized conveyor roller 400 in accordance with the present disclosure can comprise one or more additional and/or alternative elements, and/or can be different from that illustrated in FIG. 4. For example, a conveyor roller in accordance with the present disclosure can include adjustable components to controllably divert items at one or more positions along a conveyor line.

Figure 5A:
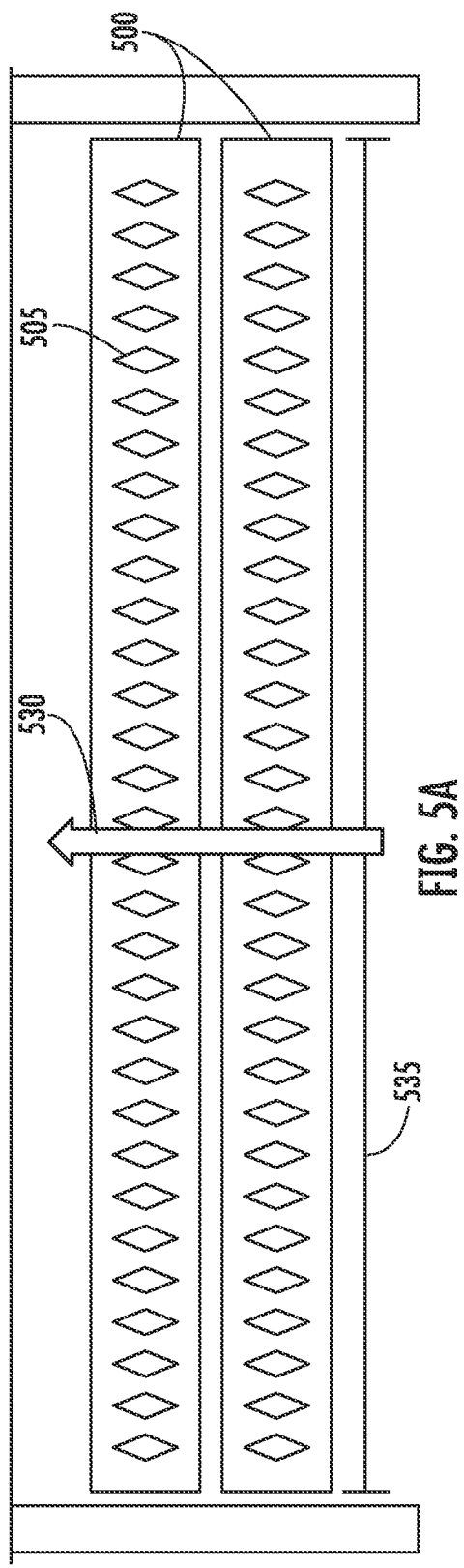
FIGS. 5A-B illustrate example top views of a conveyor roller with element in-built diverts in accordance with various embodiments of the present disclosure.
Figure 5B:
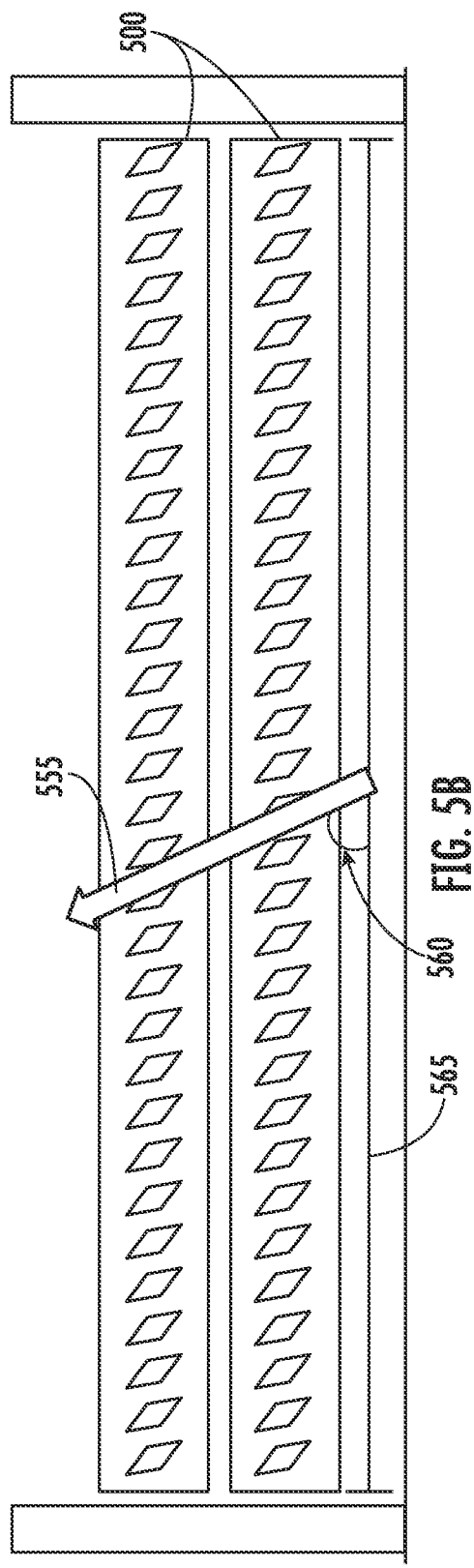

FIGS. 5A-B illustrate example top views of a conveyor roller with element in-built diverts in accordance with various embodiments of the present disclosure. FIG. 5A illustrates a top view of example conveyor rollers 500 in a first, non-diverting configuration 525. FIG. 5B illustrates a top view of the example conveyor rollers 500 in a second, diverting configuration 550.

The example conveyor rollers 500 can include motorized or non-motorized conveyor rollers. For example, the conveyor rollers 500 can be similar to the integrated motorized conveyor rollers 300 and 400 discussed above in connection with FIGS. 3 and 4. For instance, the conveyor rollers 500 can be part of a conveyor line/conveyor system. The conveyor rollers 500 can be configured to drive one or more non-motorized conveyor rollers that are operatively coupled thereto. In addition, or alternatively, the conveyor rollers 500 can be driven by another roller operatively coupled thereto. The conveyor rollers 500 can be configured to convey items along at least a portion of a conveyor line based at least in part on system instructions and/or user interactions via a computing entity (such as the user computing entity 108 described above in connection with FIG. 1).

The conveyor rollers 500 can include moveable, element in-built diverts 505 that enable the use of the conveyor rollers 500 in both non-diverting and diverting sections of a conveyor line. The element in-built diverts 505, for example, can be positioned at one or more locations of the conveyor rollers 500 to divert an item at one or more positions of a conveyor line. The orientation of the element in-built diverts 505 can be modified to reconfigure the conveyor rollers 500 between at least (i) the non-diverting configuration 525 in which an item can be moved in a non-diverting direction 530 as illustrated by FIG. 5A; and (ii) the diverting configuration 550 in which an item can be moved in a diverting direction 555 as illustrated by FIG. 5B. The non-diverting direction 530 can include a forward and/or backward direction perpendicular to the length 535 of the conveyor rollers 500. The diverting direction 555 can include an angled direction at an angle 560 with respect to the length 565 of the conveyor rollers 500. In this manner, the element in-built diverts 505 allow for the diversion of items at any point along a conveyor line using a single type of conveyor roller.

Figure 6A:
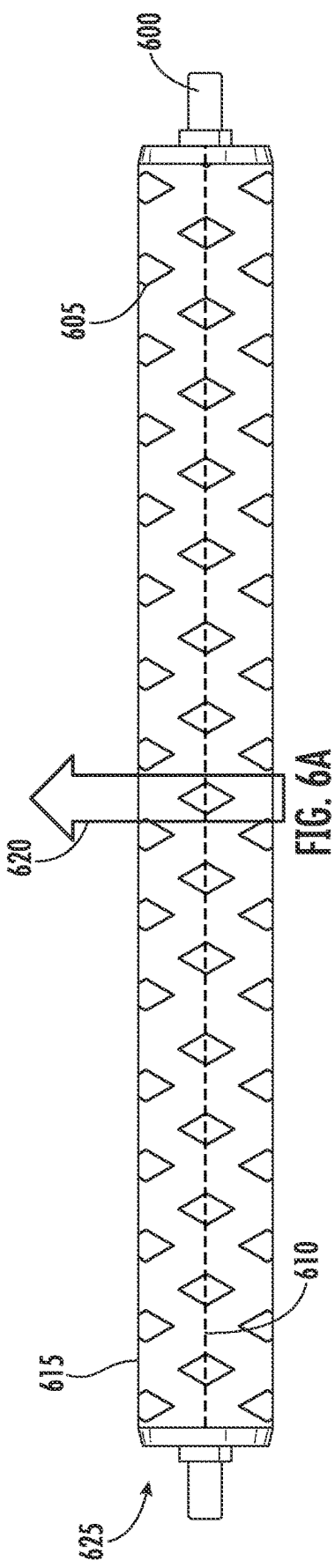
FIGS. 6A-C illustrate example side views of a conveyor roller with element in-built diverts in accordance with various embodiments of the present disclosure.
Figure 6B:
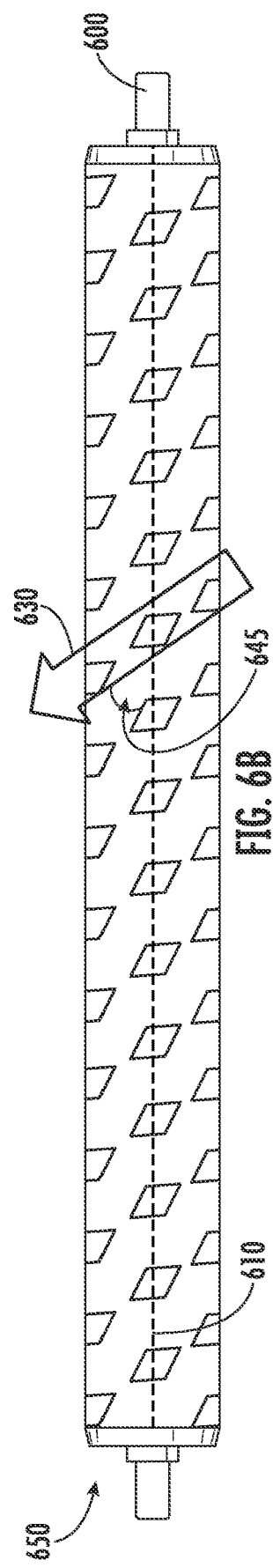
Figure 6C:
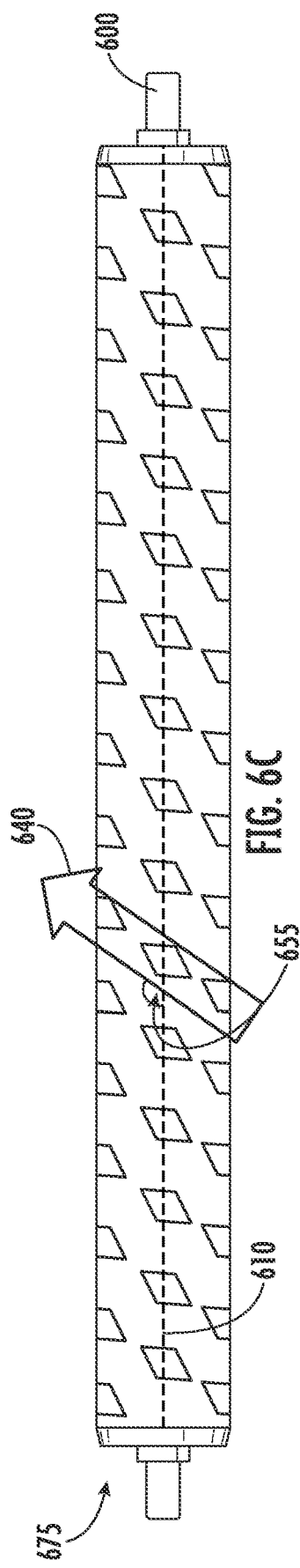

FIGS. 6A-C illustrate example side views of a conveyor roller 600 with element in-built diverts in accordance with various embodiments of the present disclosure. FIG. 6A illustrates a side view of the conveyor rollers 600 in a first, non-diverting configuration 625. FIG. 6B illustrates a side view of the conveyor roller 600 in a first, left diverting configuration 650. FIG. 6C illustrates a side view of the conveyor roller 600 in a second, right diverting configuration 675.

The example conveyor roller 600 can include motorized or non-motorized conveyor roller. For example, the conveyor rollers 600 can be similar to the integrated motorized conveyor rollers 300 and 400 discussed above in connection with FIGS. 3 and 4. For instance, the conveyor roller 600 can be part of a conveyor line/conveyor system. The conveyor roller 600 can be configured to drive one or more non-motorized conveyor rollers that are operatively coupled thereto. In addition, or alternatively, the conveyor rollers 600 can be driven by another roller operatively coupled thereto. The conveyor roller 600 can be configured to convey items along at least a portion of a conveyor line based at least in part on system instructions and/or user interactions via a computing entity (such as the user computing entity 108 described above in connection with FIG. 1).

The conveyor roller 600 can include a housing 615. The housing 615 can form a cylindrical tube. In some embodiments, the cylindrical tube can be at least partial hollow. The conveyor roller 600 can be configured to rotate the housing 615 about a center axis to move an item disposed on an exterior surface of the housing 615. As described herein, the housing 615 can be rotated by one or more components of the conveyor roller 600 or the housing 615 can be rotated by another one or more components of another conveyor roller 600.

The conveyor roller 600 can include a plurality of element in-built diverts 605 disposed on an exterior surface of the housing 615. The plurality of element in-built diverts 605 can protrude from the exterior surface of the housing 615. For example, the plurality of element in-built diverts 605 can protrude a threshold distance (e.g., one or more centimeters, inches, etc.) from the housing 615 to make contact with an item disposed on the housing 615. In this manner, the plurality of element in-built diverts 605 can form a second diameter that is larger than the diameter of the housing 615. As depicted by FIG. 8, a conveyor section can include a plurality of conveyor rollers with element in-built diverts. Each of the conveyor rollers can include a same diameter (e.g., formed by respective in-built diverts elements of the conveyor rollers) to achieve divert functionality.

The plurality of element in-built diverts 605 can form a plurality of ridges around the exterior surface (e.g., the circumference) of the housing 615. The plurality of ridges can include a plurality of complete (e.g., continuous) ridges around the exterior surface of the housing 615. In addition, or alternatively, the plurality of ridges can include a plurality partial (e.g., broken) ridges around the exterior surface of the housing 615. The plurality of element in-built diverts 605 can include one or more different shapes and/or can be arranged in one or more different arrangements on the exterior surface of the housing 615. The shapes and/or arrangements can form one or more different ridges around the exterior surface of the housing 615.

By way of example, the FIG. 7 illustrates example divert element configurations 700 in accordance with various embodiments of the present disclosure. Each of the divert element configurations 700 include a plurality of element in-built diverts disposed at one or more positions on the exterior surface of conveyor roller housing. The element in-built diverts can be comprised of any metal, polymer, and/or rubber-based material. In some embodiments, the element in-built diverts can be comprised of a metal material. The metal material, for example, can include one or more magnetic properties that can be exploited to change an orientation of the element in-built diverts.

The plurality of divert elements can include a plurality of different shapes and/or sizes. For instance, the plurality of divert elements can include a diverting surface in the shape of diamond, parallelogram, triangle, square, lines and/or any other geometrical shape. The divert element configurations 700 can include one or more different staggered and/or linear arrangements of the plurality of divert elements. For instance, the plurality of element in-built diverts can be arranged in a staggered pattern on the exterior surface of the housing. In addition, or alternatively, the plurality of element in-built diverts can be arranged in a linear pattern on the exterior surface of the housing.

As one example, the plurality of divert elements can include one or more diamond divert elements 710. The diamond divert elements 710 can be arranged in a staggered diamond arrangement 705. In addition, or alternatively, the diamond divert elements 710 can be arranged in a linear diamond arrangement 715.

As another example, the plurality of divert elements can include one or more parallelogram divert elements 725. The parallelogram divert elements 725 can be arranged in a staggered parallelogram arrangement 720. In addition, or alternatively, the parallelogram divert elements 725 can be arranged in a linear parallelogram arrangement 730.

As another example, the plurality of divert elements can include one or more triangle divert elements 740. The triangle divert elements 740 can be arranged in a staggered triangle arrangement 735. In addition, or alternatively, the triangle divert elements 740 can be arranged in a linear triangle arrangement 745.

As yet another example, the plurality of divert elements can include one or more line divert elements 755. The line divert elements 755 can be arranged in a staggered line arrangement 750. In addition, or alternatively, the line divert elements 755 can be arranged in a linear line arrangement 760.

FIG. 7 illustrates just a few of a plurality of possible example divert element configurations 700. As stated above, the plurality of divert elements disposed on the exterior surface of the conveyor roller housing can include any shape and/or dimensions thereof and can be arranged in any arrangement on the exterior surface of the conveyor roller housing. While staggered and linear arrangements are depicted by FIG. 7, any arrangement can be used including uniform and non-uniform arrangements. Moreover, in some embodiments, the plurality of element in-built diverts can be arranged in different compatible arrangements such that multiple conveyor rollers can be closely positioned on a conveyor line.

Turning back to FIGS. 6A-C, the plurality of element in-built diverts 605 (and/or ridges thereof) can form a reconfigurable surface that protrudes from the exterior surface of the housing 615. The reconfigurable surface can make contact with items to move the items in a direction relative to a housing 615. The reconfigurable surface can be controlled, by moving the plurality of element in-built diverts 605, to alter a direction in which an item is moved with respect to the conveyor roller 600.

For example, the plurality of element in-built diverts 605 can be reconfigurable between one or more orientations with respect to the housing 615. At each orientation, the plurality of element in-built diverts 605 can form a different surface for moving an item at a particular angle with respect to the conveyor roller 600.

As one example, the plurality of element in-built diverts 605 can be configured in a non-diverting orientation to form the non-diverting configuration 625 of FIG. 6A. In the non-diverting orientation, the plurality of element in-built diverts 605 can form a non-diverting plurality of ridges (e.g., partial or complete) that are operable to maintain a motion (e.g., a forward/backward motion) of an item disposed on the conveyor roller 600. For instance, the housing 615 of the conveyor roller 600 can be configured to rotate about a center axis 610. The non-diverting orientation can correspond to a non-diverting angle perpendicular to the center axis 610 of the conveyor roller 600. By way of example, the non-diverting orientation of the plurality of element in-built diverts 605 can include an angle perpendicular to the center axis 610 such that, upon contact with the item, the plurality of element in-built diverts 605 can apply a force to the item in a non-diverting direction 620 (e.g., forward, backward, etc.) with respect to the center axis 610 of the conveyor roller 600.

As another example, the plurality of element in-built diverts 605 can be configured in a diverting orientation. The diverting orientation can correspond to a diverting angle with respect to the center axis 610 of the conveyor roller 600. In the diverting orientation, the plurality of element in-built diverts 605 can form a diverting plurality of ridges (e.g., partial or complete) that are operable to divert a motion of an item disposed on the conveyor roller 600.

For instance, the plurality of element in-built diverts 605 can be configured in a diverting orientation to form the left diverting configuration 650 of FIG. 6B. The diverting orientation of the plurality of element in-built diverts 605 can include a leftward angle 645 (e.g., a 45-degree angle, etc.) with respect to the center axis 610. The leftward angle 645, for example, can include a non-right angle (e.g., an acute angle, etc.) with respect to the center axis 610 such that, upon contact with the item, the plurality of element in-built diverts 605 can apply a force to the item in a leftward diverting direction 630 with respect to the center axis 610 of the conveyor roller 600.

In addition, or alternatively, the plurality of element in-built diverts 605 can be configured in a diverting orientation to form the right diverting configuration 675 of FIG. 6C. The diverting orientation of the plurality of element in-built diverts 605 can include a rightward angle 655 (e.g., a 135-degree angle, etc.) with respect to the center axis 610. The rightward angle 655, for example, can include a non-right angle (e.g., an obtuse angle, etc.) with respect to the center axis 610 such that, upon contact with the item, the plurality of element in-built diverts 605 can apply a force to the item in a rightward diverting direction 640 with respect to the center axis 610 of the conveyor roller 600.

The degree of the leftward angle 645 and the rightward angle 655 can be reconfigurable to modify a degree at which an item is diverted from the conveyor roller 600. In some embodiments, the conveyor roller 600 can be grouped together with a plurality of conveyor rollers along a conveyor line. The orientation of the element in-built diverts for one or more of the plurality of conveyor rollers can be configured at various angles to move an item in a desired direction.

For example, FIG. 8 illustrates an example conveyor roller line 800 in accordance with various embodiments of the present disclosure. The conveyor roller line 800 can include a plurality of conveyor rollers 805 with element in-built diverts 810. In addition, the conveyor roller line 800 can include a plurality of sections including a first straight section 850 and a second straight section 875 connected at a corner. As illustrated, a configuration of the element in-built diverts 810 can be changed at one or more of the conveyor rollers 805 to move the item 835 around the corner from the first straight section 850 to the second straight section 875 without a separate diverting section (e.g., diverting section 252 of FIG. 2B).

By way of example, as illustrated by FIG. 8, one or more first conveyor rollers 815 can include a plurality of element in-built diverts 810 in a non-diverting configuration. The one or more first conveyor rollers 815 can rotate about a center axis to move the item in a forward direction along the conveyor roller line 800. In addition, one or more second conveyor rollers 820 can include a plurality of element in-built diverts 810 in a diverting configuration. The one or more second conveyor rollers 820 can rotate about a center axis to move the item in a right diverting direction 840 along the first straight section 850 of the conveyor roller line 800 towards the second straight section 875 of the conveyor roller line 800.

In some embodiments, the orientation of the element in-built diverts 810 on each of the second conveyor rollers 820 can be configured at different angles to progressively move the item 835 across the first straight section 850. For example, the orientation of the element in-built diverts 810 at an initial second conveyor roller 825 can be different (e.g., angled at a different degree, etc.) than a final second conveyor roller 830. In this manner, the item 835 can be progressively advanced toward the second straight section 875 of the conveyor roller line 800 as the item 835 is moved toward the connecting corner.

FIG. 8 illustrates one example conveyor roller line 800 that uses a plurality conveyor rollers 805 for reconfiguring the placement of items on the conveyor roller line 800. In some embodiments, the placement of items on a conveyor roller line can be further improved using a plurally of modular conveyor rollers.

Figure 9A:
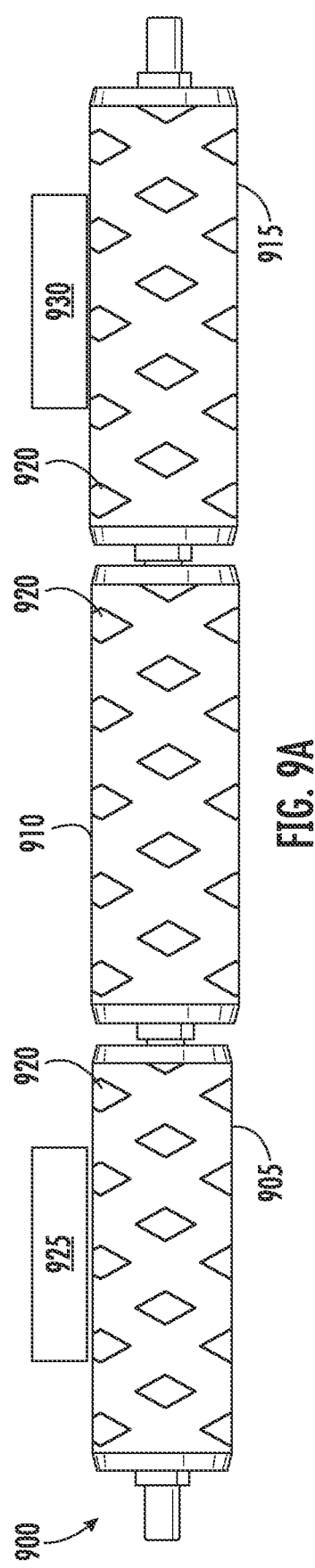
FIGS. 9A-C illustrate an example modular conveyor roller in accordance with various embodiments of the present disclosure.
Figure 9B:
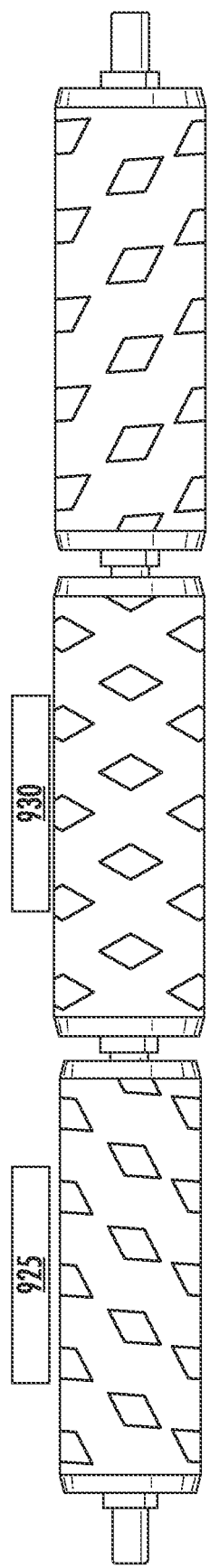
Figure 9C:
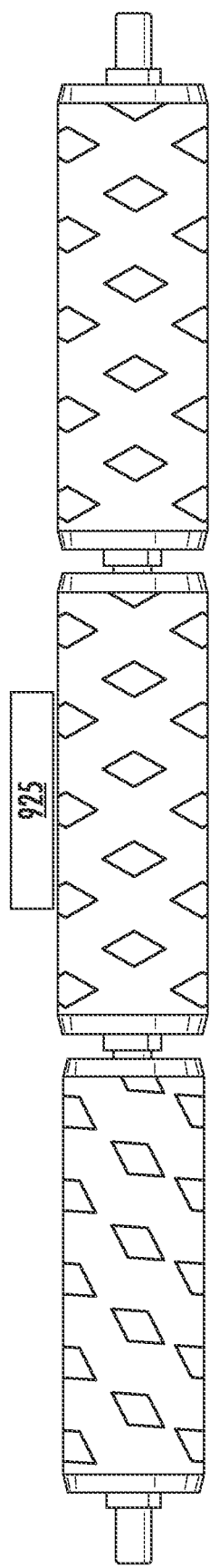

FIGS. 9A-C illustrate an example modular conveyor roller 900 in accordance with various embodiments of the present disclosure. The modular conveyor roller 900 can include multiple reconfigurable conveyor rollers including a first conveyor roller 905, a second conveyor roller 910, and a third conveyor roller 915. Although three conveyor rollers are illustrated by FIGS. 9A-C, it is noted that any number of conveyor roller embodiments are contemplated by the present disclosure.

The first conveyor roller 905, the second conveyor roller 910, and the third conveyor roller 915 can be coupled to form the modular conveyor roller 900. The conveyor rollers can be coupled using one or more mechanical and/or magnetic attachment mechanisms such as, for example, those discussed herein with reference to FIGS. 2-4. Each of the first conveyor roller 905, the second conveyor roller 910, and the third conveyor roller 915 can include a plurality of individually controlled element in-built diverts 920. The individually controlled element in-built diverts 920 can be controlled to adjust the placement of items, such as the first item 925 and the second item 930, on the modular conveyor roller 900 (or a conveyor roller subsequent to the modular conveyor roller 900 in a conveyor line).

FIG. 9A, for example, depicts a first configuration in which the individually controlled element in-built diverts 920 of the first conveyor roller 905, the second conveyor roller 910, and the third conveyor roller 915 are oriented in non-diverting configuration. In the first configuration, the first item 925 and the second item 930 can maintain their positions on the modular conveyor roller 900 (or a conveyor roller subsequent to the modular conveyor roller 900 in a conveyor line).

FIG. 9B depicts a second configuration in which the individually controlled element in-built diverts 920 of the first conveyor roller 905 and the second conveyor roller 910 are oriented in a non-diverting configuration and the element in-built diverts 920 of the third conveyor roller 915 are oriented in a leftward diverting configuration. In the second configuration, the first item 925 can maintain its position on the modular conveyor roller 900 and the second item 930 can be diverted from its position on the third conveyor roller 915 to another position on the second conveyor roller 910 (or a conveyor roller subsequent to the modular conveyor roller 900 in a conveyor line).

FIG. 9C depicts a third configuration in which the individually controlled element in-built diverts 920 of the second conveyor roller 910 and the third conveyor roller 915 are oriented in a non-diverting configuration and the element in-built diverts 920 of the first conveyor roller 905 are oriented in a rightward diverting configuration. In the third configuration, the first item 925 can be diverted from its position on the first conveyor roller 905 to another position on the second conveyor roller 910 (or a conveyor roller subsequent to the modular conveyor roller 900 in a conveyor line).

While FIGS. 9A-C depict an example modular conveyor roller 900, it is noted that the scope of the present disclosure is not limited to the examples shown in FIGS. 9A-C. An example modular conveyor roller 900 modular conveyor roller 900 in accordance with the present disclosure can comprise one or more additional and/or alternative elements, and/or can be different from that illustrated in FIGS. 9A-C.

Figure 10:
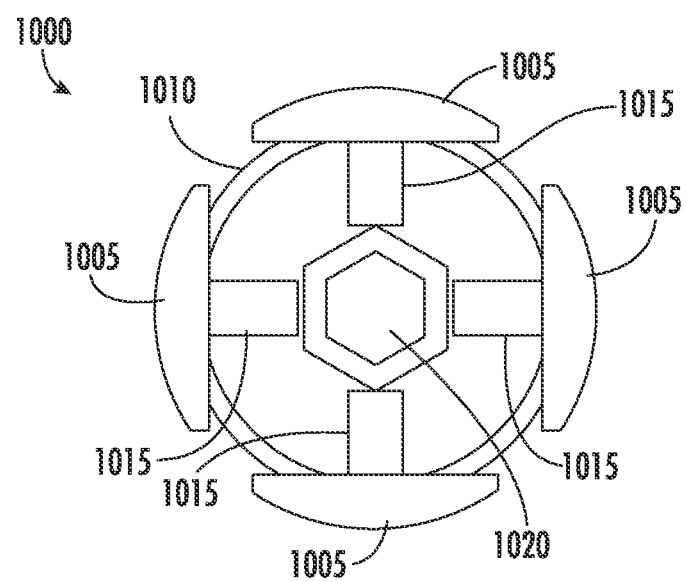
FIG. 10 illustrates an example cross section view of an example conveyor roller with a divert assembly in accordance with various embodiments of the present disclosure.

FIG. 10 illustrates an example cross section view of an example conveyor roller 1000 with a divert assembly in accordance with various embodiments of the present disclosure. The divert assembly can include a plurality of element in-built diverts 1005 and at least one actuator operatively coupled to the element in-built diverts 1005.

The element in-built diverts 1005 can be fixed around an exterior circumference of the housing 1010 of the conveyor roller 1000. In some embodiments, the element in-built diverts 1005 can be linked to mechanical links 1015 within the housing 1010 of the conveyor roller 1000. For instance, the conveyor roller 1000 can include a plurality of mechanical links 1015 disposed within the housing 1010. The plurality of mechanical links 1015, for example, can include a respective mechanical link coupled to a respective element in-built divert. In some embodiments, the mechanical links 1015 can be coupled to a center shaft 1020 of the conveyor roller 1000 at a first, interior end and coupled to the element in-built diverts 1005 at a second, exterior end. As described herein, in some embodiments, the mechanical links 1015 can include at least a portion of an actuator for the divert assembly.

The element in-built diverts 1005 can be physically coupled to the mechanical links 1015. For example, the housing 1010 can include a plurality of apertures. The apertures, for instance, can include at least one aperture between each pair of element in-built diverts 1005 and corresponding mechanical links 1015. In some embodiments, a respective element in-built divert can be physically coupled to a respective mechanical link through a respective aperture in the housing 1010. For instance, the respective mechanical link can be coupled to the respective element in-built divert through the respective aperture of the housing 1010.

In addition, or alternatively, the element in-built diverts 1005 can be indirectly coupled to the mechanical links 1015 through the exterior surface of the housing 1010. By way of example, the element in-built diverts 1005 can be electrically coupled (e.g., magnetically coupled, etc.) to the mechanical links 1015. In this manner, the mechanical links 1015 can be coupled to a respective element in-built divert through a physical layer of the housing 1010.

The divert assembly can include one or more actuators operatively coupled to the element in-built diverts. For example, the element in-built diverts 1005 can be operatively coupled to the one or more actuators. In addition, or alternatively, the one or more actuators can be operatively coupled to the element in-built diverts through the mechanical links 1015. The actuators can include one or more actuation devices configured to change an orientation of the element in-built diverts 1005. In some embodiments, the actuators can change an orientation of the element in-built diverts 1005 by moving the mechanical links 1015.

For example, the actuation devices can include a mechanical lever operatively connected the mechanical links 1015. The mechanical lever, for example, can be coupled to each of the mechanical links 1015. The mechanical lever can be actuated to physically move (e.g., twist, rotate, etc.) the mechanical links 1015 to change an orientation of the connected element in-built diverts 1005. In this manner, the mechanical links 1015 can be adjusted, using the mechanical lever, to change a current orientation of the element in-built diverts 1005.

In addition, or alternatively, the actuation devices can include one or more magnetic actuators. The magnetic actuators can cause a movement (e.g., a change an orientation) of the element in-built diverts 1005 by actuating an external magnetic field configured to magnetically push and/or pull the element in-built diverts 1005 in a particular direction. By way of example, the magnetic actuators can include a magnetic switchable device operable to change a magnetic field of the housing 1010. A current orientation of the plurality of element in-built diverts 1005 can be based on the magnetic field of the housing 1010 such that a change in the magnetic field of the housing 1010 can initiate a change to the orientation of the element in-built diverts 1005.

In some embodiments, the actuation devices can include an electromagnetic actuation system operable to change a current orientation of the plurality of element in-built diverts. The electromagnetic actuation systems can include an electrical motor, a solenoid actuator, moving coil actuator, and/or any other actuation system capable of applying a force to the element in-built diverts 1005 and/or the mechanical links 1015. In some embodiments, the electromagnetic actuation systems can cause a movement to the mechanical links 1015 to change an orientation of the element in-built diverts 1005 as described herein.

In some embodiments, the divert assembly can automatically change the orientations of the element in-built diverts 1005. For example, the actuator devices can cause the element in-built diverts 1005 to automatically change their orientations. For example, as discussed with reference to FIG. 4, a conveyor roller can include a motor assembly and a drive assembly at least partially disposed within the conveyor housing that are configured to cause rotation of at least a portion of the conveyor roller.

In some embodiments, an actuation device (e.g., external magnetic actuators, mechanical lever, electro-mechanical actuation systems, etc.) can be operatively coupled to the motor assembly and the motor assembly can be configured to control the actuator to change an orientation of the element in-built diverts 1005. As one example, the mechanical links 1015 can be operatively coupled to the motor assembly. The motor assembly can be configured to adjust the mechanical link to change the current orientation of the element in-built diverts 1005.

Moreover, in some embodiments, the conveyor roller can include a controller component in electronic communication with the motor assembly and the drive assembly. The controller component can be configured to initiate the actuation (e.g., via an external magnetic actuator, mechanical lever, electro-mechanical actuation system, etc.) to change the current orientation of the element in-built diverts 1005. For instance, the controller component can be configured to cause an adjustment of the mechanical links 1015 responsive to an input indicative of a desired orientation for the plurality of element in-built diverts 1005.

Figure 11:
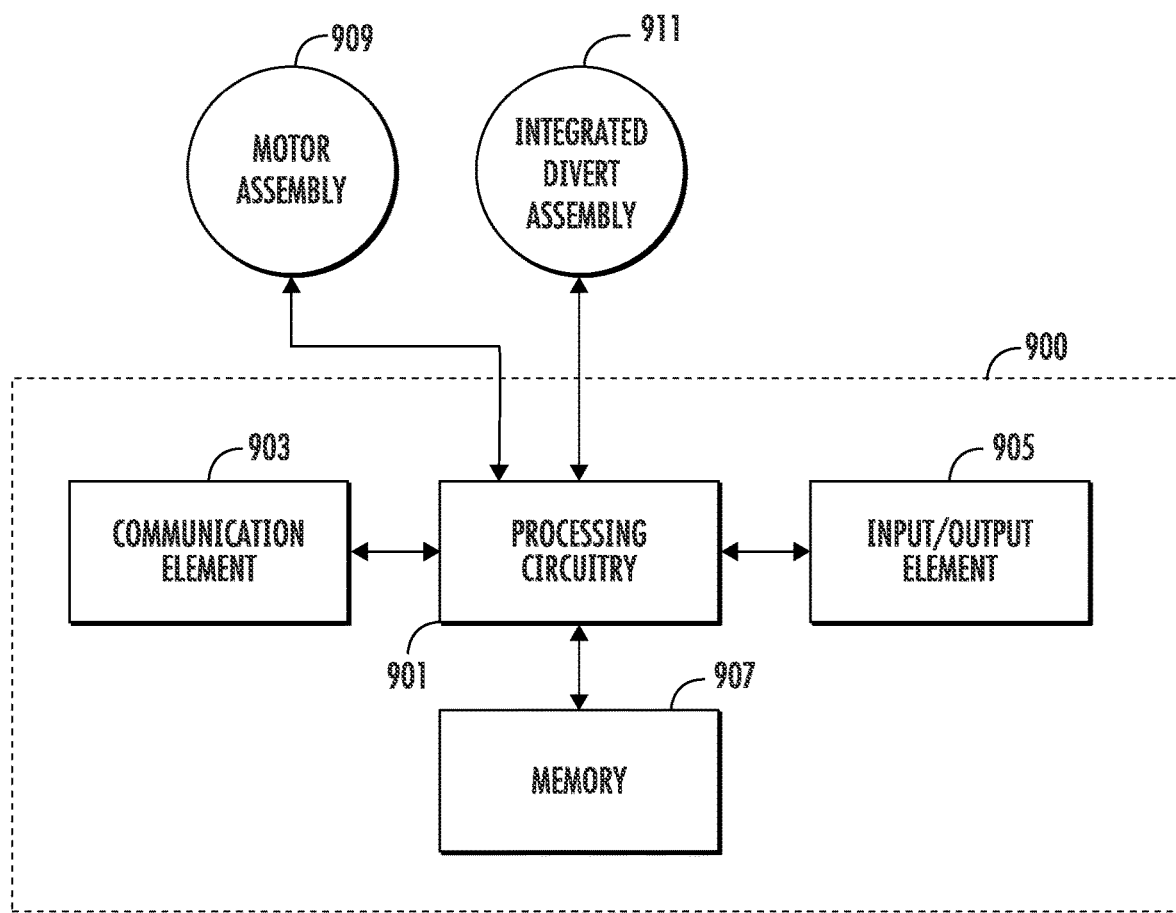
FIG. 11 illustrates an example controller component in electronic communication with various other components of an example integrated motorized conveyor roller in accordance with various embodiments of the present disclosure.

Referring now to FIG. 11, a schematic diagram depicting an example controller component 1100 in electronic communication with a motor assembly 1109 and integrated divert assembly 1111 of a conveyor roller in accordance with various embodiments of the present disclosure is provided. As shown, the controller component 1100 comprises processing circuitry 1101, a communication element 1103, input/output element 1105, a memory 1107 and/or other components configured to perform various operations, procedures, functions or the like described herein.

In some embodiments, the controller component 1100 can be or comprise a printed circuit board (PCB). In some examples, the controller component 1100 can further comprise one or more of a full bridge motor driver, a hall sensor, one or more thermal sensors, one or more user interfaces, one or more protection circuits, configuration management circuitry, a wireless interface, sensing element circuitry (e.g., image sensor circuitry), an interface connector, power control circuitry, gate driver circuitry and/or the like.

The processing circuitry 1101 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 11 as a single processor, in an embodiment, the processing circuitry 1101 can include a plurality of processors and signal processing modules. The plurality of processors can be embodied on a single electronic device or can be distributed across a plurality of electronic devices collectively configured to function as the circuitry of the conveyor roller. The plurality of processors can be in operative communication with each other and can be collectively configured to perform one or more functionalities of the circuitry of the conveyor roller as described herein. In an example embodiment, the processing circuitry 1101 can be configured to execute instructions stored in the memory 1107 or otherwise accessible to the processing circuitry 1101. These instructions, when executed by the processing circuitry 1101, can cause the circuitry of the conveyor roller to perform one or more of the functionalities, as described herein.

Whether configured by hardware, firmware/software methods, or by a combination thereof, the processing circuitry 1101 can include an entity capable of performing operations according to embodiments of the present disclosure while configured accordingly. Thus, for example, when the processing circuitry 1101 is embodied as an ASIC, FPGA or the like, the processing circuitry 1101 can include specifically configured hardware for conducting one or more operations described herein. Additionally, or alternatively, when the processing circuitry 1101 is embodied as an executor of instructions, such as can be stored in the memory 1107, the instructions can specifically configure the processing circuitry 1101 to perform one or more algorithms and operations described herein.

Thus, the processing circuitry 1101 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 1107 can include suitable logic, circuitry, and/or interfaces that are adapted to store a set of instructions that is executable by the processing circuitry 1101 to perform predetermined operations. Additionally, or alternately, the memory 1107 can be configured to store data/information, application programs, instructions, etc., so that the controller component 1100 can execute various functions according to the embodiments of the present disclosure. For example, in at least some embodiments, the memory 1107 is configured to cache input data for processing by the processing circuitry 1101. Thus, in at least some embodiments, the memory 1107 is configured to store program instructions for execution by the processing circuitry 1101. The memory 1107 can store information in the form of static and/or dynamic information. When the functions are executed, the stored information can be stored and/or used by the controller component 1100. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 1107 can be integrated with the processing circuitry 1101 on a single chip, without departing from the scope of the disclosure.

The communication element 1103 can be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 1107)

and executed by a processing component 1100 (for example, the processing circuitry 1101). In some embodiments, the communication element 1103 (as with other components discussed herein) can be at least partially implemented as the processing circuitry 1101 or otherwise controlled by the processing circuitry 1101. In this regard, the communication element 1103 can communicate with the processing circuitry 1101, for example, through a bus. The communication element 1103 can comprise, for example, antennas, transmitters, receivers, transceivers, network interface cards and/or supporting hardware and/or firmware/software, and is used for establishing communication with another apparatus. The communication element 1103 can be configured to receive and/or transmit any data that can be stored by the memory 1107 by using any protocol that can be used for communication between apparatuses. The communication element 1103 can additionally or alternatively communicate with the memory 1107, the input/output element 1105 and/or any other component of the processing component 1100, for example, through a bus.

In some embodiments, the processing component 1100 can comprise an input/output element 1105. The input/output element 1105 can communicate with the processing circuitry 1101 to receive instructions input by the user and/or to provide audible, visual, mechanical or other outputs to the user. Therefore, the input/output element 1105 can comprise supporting devices, such as a keyboard, a mouse, a display, a touch screen display, and/or other input/output mechanisms. Alternatively, at least some aspects of the input/output element 1105 can be implemented on a device used by the user to communicate with the processing component 1100. The input/output element 1105 can communicate with the memory 1107, the communication element 1103 and/or any other component, for example, through a bus. One or a plurality of input/output modules and/or other components can be included in the processing component 1100.

Figure 12:
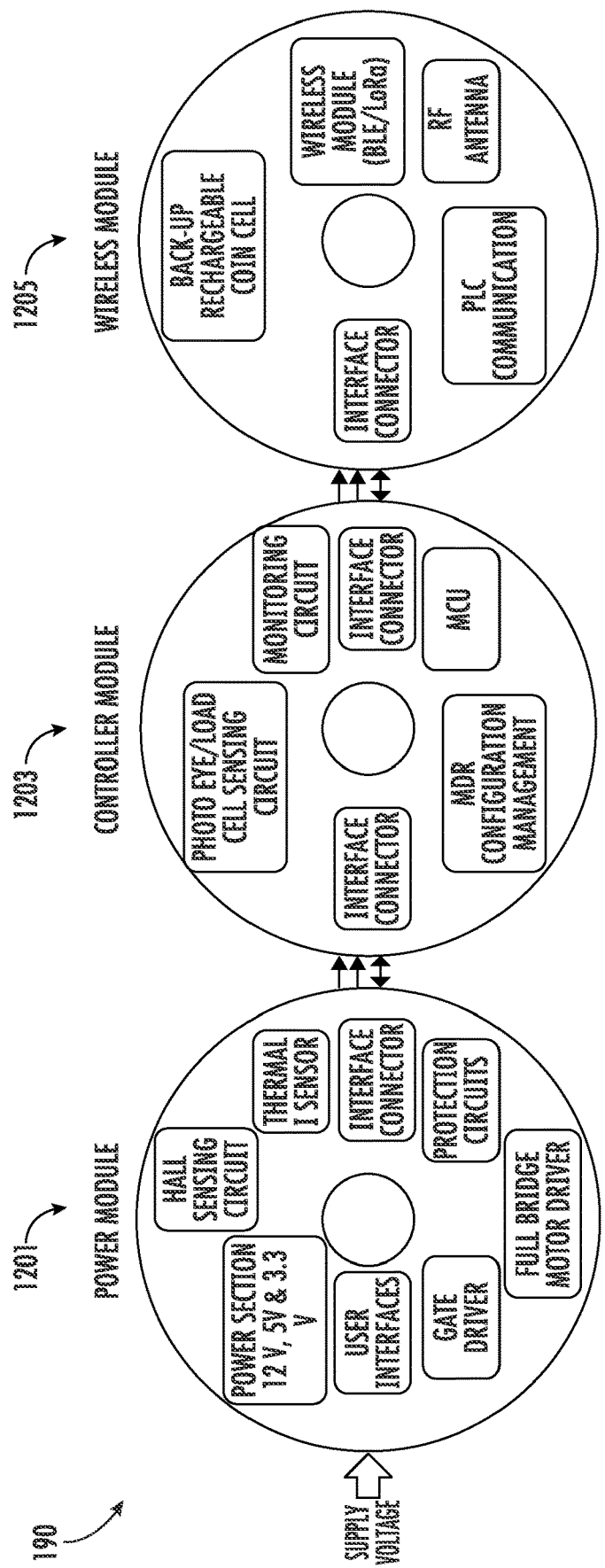
FIG. 12 illustrates an example controller component in accordance with various embodiments of the present disclosure.

Referring now to FIG. 12, a schematic diagram depicting an example controller component 1200 of a conveyor roller in accordance with various embodiments of the present disclosure is provided. In some examples, the controller component 1200 can be similar or identical to the controller component 417 described above in connection with FIG. 4.

In some embodiments, as depicted, the controller component 1200 can be or comprise a PCB stack comprising a plurality of PCBs in electronic communication with one another via interface connectors. In particular, as depicted, the controller component 1200 comprises a power module 1201, a controller module 1203 and a wireless module 1205.

As depicted in FIG. 21, the power module 1201 comprises a first PCB configured to control operations of electronic elements of the conveyor roller. In the depicted embodiment, the power module 1201 is configured to receive/condition a power supply and comprises one or more of a Hall sensing circuit, a thermal sensor, interface connector(s), one or more protection circuits, a full bridge motor driver, a gate driver, one or more user interfaces and a power section.

As noted above, the controller component 1200 comprises a controller module 1203. The controller module 1203 comprises a second PCB that is configured to control various operations of the conveyor roller. In the depicted embodiment, the controller module 1203 comprises at least one sensing element (e.g., photo eye) circuit, interface connector(s), a micro controller unit (MCU) and a conveyor roller configuration management circuit.

As noted above, the controller component 1200 comprises a wireless module 1205. The wireless module 1205 comprises a third PCB that is configured to provide a communication interface (e.g., Bluetooth, BLE, LoRa, and/or the like). For example, between the conveyor roller and one or more other conveyor rollers.

As further depicted in FIG. 12, the wireless module 1205 comprises a power supply (e.g., back-up rechargeable coin cell) a BLE and/or LoRa interface, a communication element, a monitoring circuit and interface connector(s).

In some embodiments, as depicted in FIG. 12, the controller component 1200 can comprise a monitoring circuit for monitoring operations and/or operational conditions of the conveyor roller (e.g., providing self-check functionality) via one or more sensing elements. By way of example, a monitoring circuit of the controller component 1200 can be operatively coupled to a magnetic sensing element (e.g., an inductor or transformer). During operations, the rotation of the conveyor roller motor assembly generates a magnetic field which in turn generates a measurable electrical signal (e.g., voltage output) across the magnetic sensing element coupled thereto. An output of a comparator circuit can be used to provide an output describing one or more parameters associated with conveyor roller (e.g., a lifetime motor operational time, number of rotations, loading conditions, vibrational information, installation issues, belt wear out, and/or the like). In some embodiments, at least a portion of the output of the comparator circuit can be measured and stored in memory. In some examples, the controller component 1200 can provide a control indication to actuate an LED element in response to detecting certain conditions (e.g., complete loss of motor function or overload scenario). In various embodiments, the controller component 1200 can be operatively coupled to other types of sensing elements including pressure sensors, vibrational sensors, temperature sensors, position sensors, and/or the like.

In various embodiments, the controller component 1200 can store (e.g., periodically and/or in response to requests) information/data describing various operational parameters of the conveyor roller including lifetime motor operational time, object information (e.g., information describing presence/absence of an object and/or other characteristics, image data or the like).

While FIG. 12 depicts an example controller component 1200 (e.g., PCB stack), it is noted that the scope of the present disclosure is not limited to the example shown in FIG. 12. An example controller component 1200 in accordance with the present disclosure can comprise one or more additional and/or alternative elements, and/or can be different from that illustrated in FIG. 12. For example, a conveyor roller in accordance with the present disclosure can comprise a single PCB or more than three PCBs.

Figure 13:
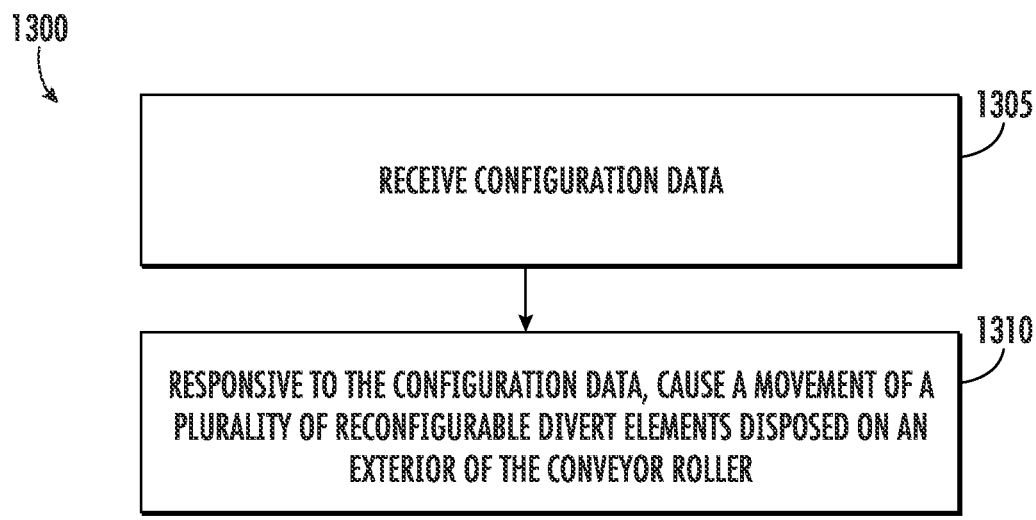
FIG. 13 is a flowchart diagram illustrating example operations in accordance with various embodiments of the present disclosure.

Referring now to FIG. 13, a flowchart diagram illustrating example operations 1300 in accordance with various embodiments of the present disclosure is provided. In some examples, the example operations 1300 can be performed by various system components (for example, but not limited to, processing circuitry of a computing entity 106 described above with regard to FIG. 1). The system components can be or comprise a central server. In some examples, the system components can include processing circuitry that can be electrically coupled to and/or in electronic communication with other circuitries, such as, but not limited to, one or more conveyor rollers (such as, for example, the integrated motorized conveyor roller 400, the conveyor roller 500, conveyor roller 600, conveyor roller 900, conveyor roller 1000, etc. described above in connection with FIGS. 4-6 and 9-10).

At 1305, the operations 1300 can include receiving, by a controller component of a conveyor roller, configuration data from a computing entity in electronic communication with the controller component. For instance, the controller component can receive the configuration data from the computing entity in electronic communication with the controller component. The configuration data can be indicative of a diversion angle for the conveyor roller. The diversion angle can indicate an angle for diverting an item from a conveyor line, to another section of the conveyor line, and/or to another position along the length of the conveyor rollers that make up the conveyor line. In some embodiments, the diversion angle can indicate a desire to not divert an item. In other embodiments, the diversion angle can indicate a desire to divert an item and, in some examples, a particular angle for accomplishing the desired diversion.

At 1310, the operations 1300 can include causing, by the controller component and based at least in part on the configuration data, a movement of a plurality of element in-built diverts disposed on an exterior surface of a housing of the conveyor roller. For instance, the controller component can cause the movement of the plurality of element in-built diverts. The controller component can cause the movement of the plurality of element in-built diverts to reconfigure an orientation of the element in-built diverts with respect to the housing of the conveyor roller. To do so, the controller component can be configured to provide one or more control instructions to an actuation device (e.g., external magnetic actuators, mechanical lever, electro-mechanical actuation systems, etc.) operatively coupled to the plurality of element in-built diverts.

The orientation of the element in-built diverts can enable the conveyor roller to move an item in one or more directions. For instance, the diversion angle can indicate an angle to divert an item from a conveyor line associated with the conveyor roller. Responsive to the diversion angle, the control component can cause a movement of the plurality of element in-built diverts to divert an item from the conveyor roller at the diversion angle.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A conveyor system comprising:
   at least one conveyor roller, the conveyor roller comprising:
   a housing forming a cylindrical tube; and
   a plurality of element in-built diverts disposed on an exterior surface of the housing, wherein the plurality of element in-built diverts are configurable between one or more orientations with respect to the housing; and
   a plurality of mechanical links disposed within the housing and coupled to a center shaft of the conveyor roller, wherein the plurality of mechanical links comprise a respective mechanical link coupled to a respective element in-built divert and wherein the respective mechanical link is adjustable to change a current orientation of the respective element in-built divert.

2. The conveyor system of claim 1, wherein the plurality of element in-built diverts protrude from the exterior surface of the housing to form a plurality of partial ridges around the exterior surface of the housing.

3. The conveyor system of claim 2, wherein the conveyor roller is configured to rotate the housing about a center axis.

4. The conveyor system of claim 3, wherein, in a diverting orientation, the plurality of element in-built diverts form a diverting plurality of partial ridges that are operable to divert a motion of an item disposed on the conveyor roller.

5. The conveyor system of claim 4, wherein the diverting orientation corresponds to a diverting angle with respect to a center axis of the conveyor roller.

6. The conveyor system of claim 3, wherein, in a non-diverting orientation, the plurality of element in-built diverts form a non-diverting plurality of partial ridges that are operable to maintain a forward motion of an item disposed on the conveyor roller.

7. The conveyor system of claim 6, wherein the non-diverting orientation corresponds to a non-diverting angle perpendicular to the center axis of the conveyor roller.

8. The conveyor system of claim 1, wherein the conveyor roller further comprising:
   a motor assembly and a drive assembly at least partially disposed within the housing that are configured to cause a rotation of at least a portion of the conveyor roller, wherein the mechanical link is operatively coupled to the motor assembly, and wherein the motor assembly is configured to adjust the respective mechanical link to change the current orientation of the respective element in-built divert.

9. The conveyor system of claim 8, wherein the conveyor roller further comprising:
   a controller component in electronic communication with the motor assembly and the drive assembly, wherein the controller component is configured to cause an adjustment of the respective mechanical link responsive to an input indicative of a diversion angle for the plurality of element in-built diverts.

10. The conveyor roller of claim 1, wherein the plurality of element in-built diverts are arranged in a staggered pattern on the exterior surface of the housing.

11. The conveyor roller of claim 1, wherein the plurality of element in-built diverts are arranged in a linear pattern on the exterior surface of the housing.

12. A computer program product comprising at least one non-transitory computer-readable storage medium having computer-readable program code portions stored therein, the computer-readable program code portions comprising an executable portion configured to:
   receive a configuration data indicative of diversion angle for a conveyor roller; and
   cause a movement of a plurality of element in-built diverts disposed on an exterior surface of a housing of the conveyor roller based at least in part on the configuration data.

13. The computer program product of claim 12, wherein the diversion angle indicates an angle to divert an item from a conveyor line associated with the conveyor roller.

14. The computer program product of claim 12, wherein causing the movement of the plurality of element in-built diverts disposed on the exterior surface of the housing of the conveyor roller comprises:

providing one or more control instructions to an actuation device operatively coupled to the plurality of element in-built diverts.

15. The computer program product of claim 12, wherein causing the movement of the plurality of element in-built diverts disposed on the exterior surface of the housing of the conveyor roller comprises:

reconfiguring an orientation of the element in-built diverts with respect to the housing of the conveyor roller.

16. The computer program product of claim 12, wherein, in a diversion angle, the plurality of element in-built diverts are operated to divert a motion of an item disposed on the conveyor roller.

17. The computer program product of claim 12, wherein, in a non-diversion angle, the plurality of element in-built diverts are operated to maintain a forward motion of an item disposed on the conveyor roller.

18. The computer program product of claim 17, wherein, the non-diversion angle is an angle perpendicular to the center axis of the conveyor roller.

19. The computer program product of claim 12, wherein the computer-readable program code portions comprise the executable portion configured to:

monitor operational conditions of the conveyor roller using at least one operational parameter received from one or more sensing elements.

20. The computer program product of claim 19, wherein the computer-readable program code portions comprise the executable portion configured to:

store the operational parameters of the conveyor roller periodically and/or in response to requests.

\* \* \* \* \*